(12) United States Patent
Yamada et al.

(10) Patent No.: US 7,079,483 B2
(45) Date of Patent: Jul. 18, 2006

(54) RING NETWORK AND METHOD FOR PATH INTERCHANGE THEREIN

(75) Inventors: Hirotaka Yamada, Yokohama (JP); Yutaka Iwagaki, Yokohama (JP); Yuichi Namioka, Yokohama (JP); Naomi Yokoyama, Nomi (JP); Yutaka Tokunou, Yokohama (JP); Kousaku Awada, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 886 days.

(21) Appl. No.: 09/981,106

(22) Filed: Oct. 16, 2001

(65) Prior Publication Data

US 2002/0146020 A1    Oct. 10, 2002

(30) Foreign Application Priority Data

Apr. 9, 2001    (JP)    ............................. 2001-109453

(51) Int. Cl.
*G01R 31/08*    (2006.01)
(52) U.S. Cl. ....................................... 370/222; 370/907
(58) Field of Classification Search ................ 370/535, 370/538, 539, 907, 222, 223, 403; 714/4, 714/43, 57
See application file for complete search history.

(56) References Cited

U.S. PATENT DOCUMENTS 5,491,696 A * 2/1996 Nishimura .................. 370/225
5,844,889 A * 12/1998 Takatsu et al. ............. 370/223
6,038,678 A * 3/2000 Fukushima et al. ............ 714/4
6,202,082 B1 * 3/2001 Tomizawa et al. .......... 709/201
6,256,291 B1 * 7/2001 Araki ......................... 370/216
6,895,182 B1 * 5/2005 Moriyama et al. ............. 398/3
2002/0024931 A1 * 2/2002 Chikazawa et al. ......... 370/228
2002/0191538 A1 * 12/2002 Ono .......................... 370/222

FOREIGN PATENT DOCUMENTS

| JP | 07212381 | 8/1995 |
|----|----------|--------|
| JP | 09214438 | 8/1997 |
| JP | 10313332 | 11/1998 |

* cited by examiner

*Primary Examiner*—Chau Nguyen
*Assistant Examiner*—Jung Park
(74) *Attorney, Agent, or Firm*—Katten Muchin Rosenman LLP

(57) ABSTRACT

A ring network, which can reduce the amount of processing, deal with the occurrence of faults, and lighten the load on an operator, includes a plurality of transmission apparatuses each including a cross-connect function unit and a communication function unit for sending and receiving messages using the overhead of an SDH frame, and a master transmission apparatus to which a command is input for switching from a UPSR to BLSR mode including a path management database, a path decision unit, and an interchange decision unit. The master transmission apparatus to which the command is input collects and stores path setting information of all of the transmission apparatuses in the path management database and sequentially performs processing for deciding on and deleting a long path and processing for interchanging a path on a protection channel to an idle work channel by sending and receiving a message.

5 Claims, 26 Drawing Sheets

FIG. 3

| NE1 | | | NE2 | | | NE3 | | | NE4 | | |
|---|---|---|---|---|---|---|---|---|---|---|---|
| From | To | CHANNEL SPEED | From | To | CHANNEL SPEED | From | To | CHANNEL SPEED | From | To | CHANNEL SPEED |
| L-1ch | HE-1ch | VC3 | HE-1ch | L-1ch | VC3 | HE-1ch | HW-1ch | VC3 | HE-1ch | HW-1ch | VC3 |
| L-1ch | HW-1ch | VC3 | HW-1ch | L-1ch | VC3 | HW-13ch | HE-13ch | VC3 | HE-13ch | L-13ch | VC3 |
| HE-13ch | HW-13ch | VC3 | L-13ch | HE-13ch | VC3 | HE-48ch | L-48ch | VC3 | HW-13ch | L-13ch | VC3 |
| HW-48ch | HE-48ch | VC3 | L-13ch | HW-13ch | VC3 | HW-48ch | L-48ch | VC3 | L-48ch | HE-48ch | VC3 |
| | | | HW-48ch | HE-48ch | VC3 | | | | L-48ch | HW-48ch | VC3 |

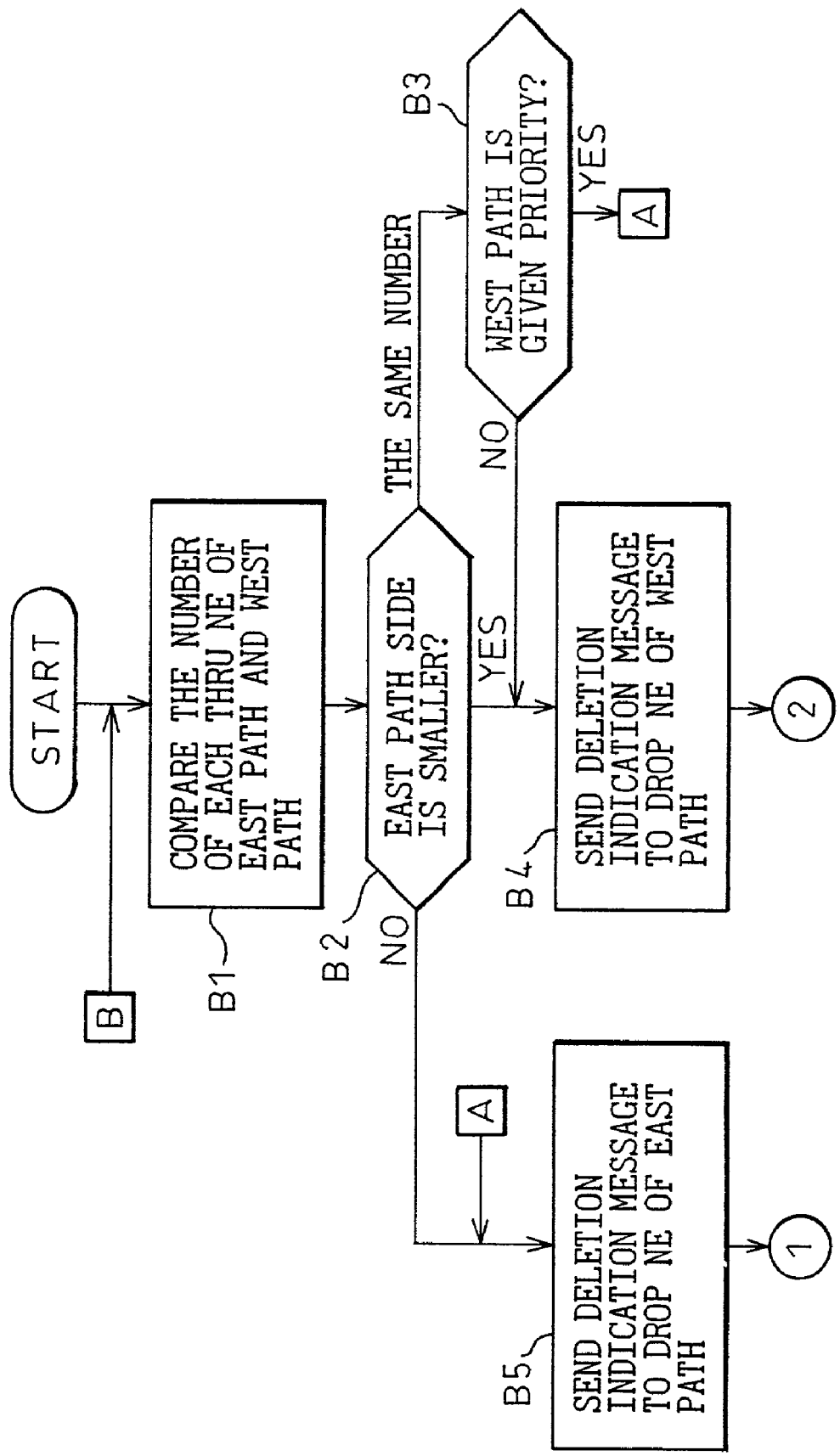

FIG.9A

| MESSAGE MEMBER | EXPLANATION |
|---|---|
| MESSAGE TYPE | CLASSIFICATION OF MESSAGE |
| SENDING NODE ID | ID OF NE SENDING MESSAGE |
| RECEIVING NODE ID | ID OF DESTINATION NE OF MESSAGE |
| MESSAGE DATA | CONTENT IS DIFFERENT DEPENDING ON MESSAGE TYPE |

FIG.9B

| MESSAGE TYPE | MESSAGE DATA | EXPLANATION |
|---|---|---|
| BLSR Update REQUEST | NODE ID | BLSR Update REQUEST MESSAGE |
| BLSR Update EXECUTION | NOTHING | BLSR Update EXECUTION MESSAGE |
| BLSR Update COMPLETION | NOTHING | BLSR Update COMPLETION MESSAGE |
| RESPONSE | OK or NG | MESSAGE RESPONDING TO REQUEST |
| PATH INFORMATION REQUEST | NOTHING | REQUEST FOR ALL PATH INFORMATION OF NE |
| PATH INFORMATION RESPONSE | PATH INFORMATION | ALL PATH INFORMATION INCLUDING INFORMATION From/To/CHANNEL SPEED |
| PATH CONTROL REQUEST | From/To/CHANNEL SPEED, SETUP/DELETION/switch/bridge | MESSAGE REQUESTING NE TO SET UP OR RELEASE PATH |

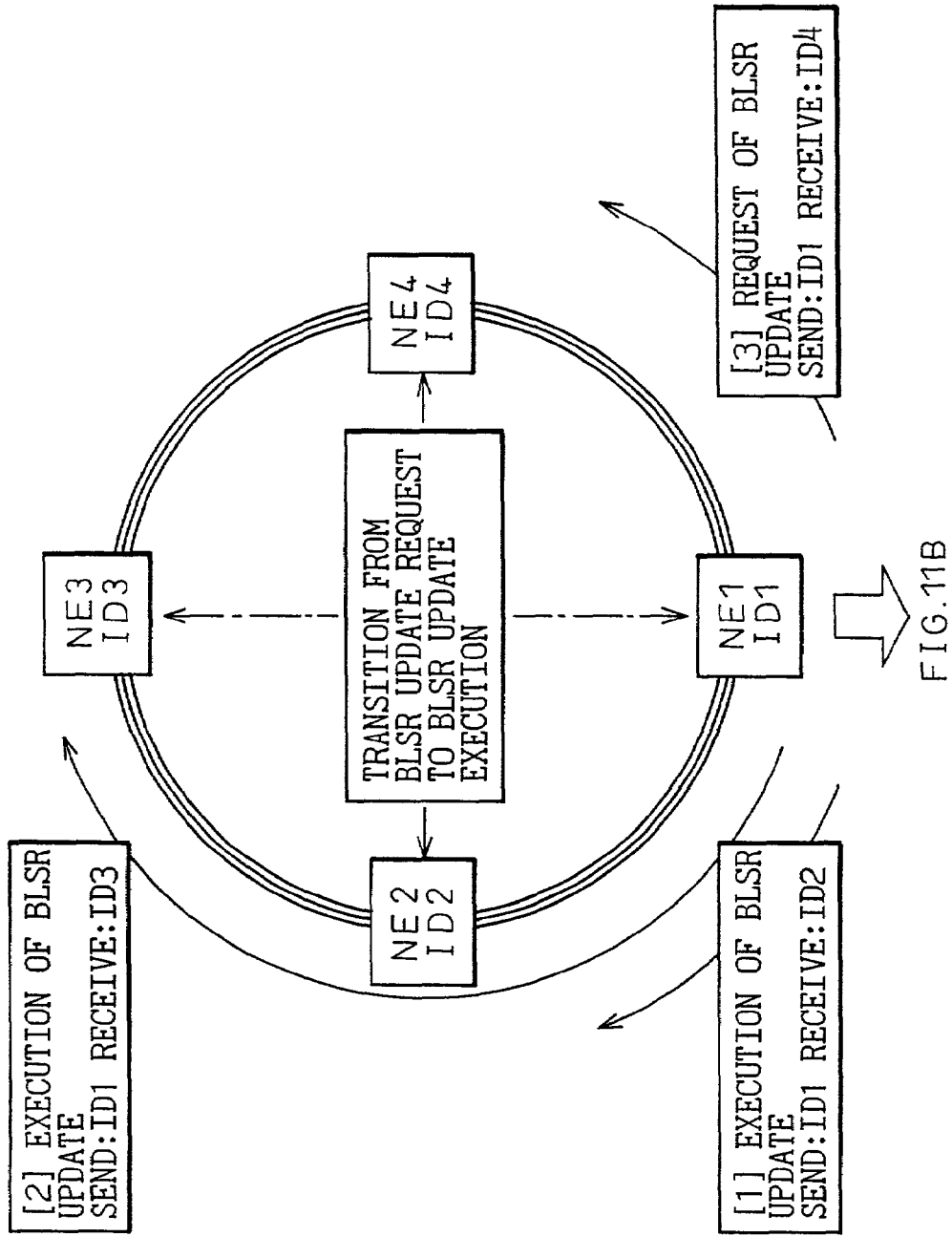

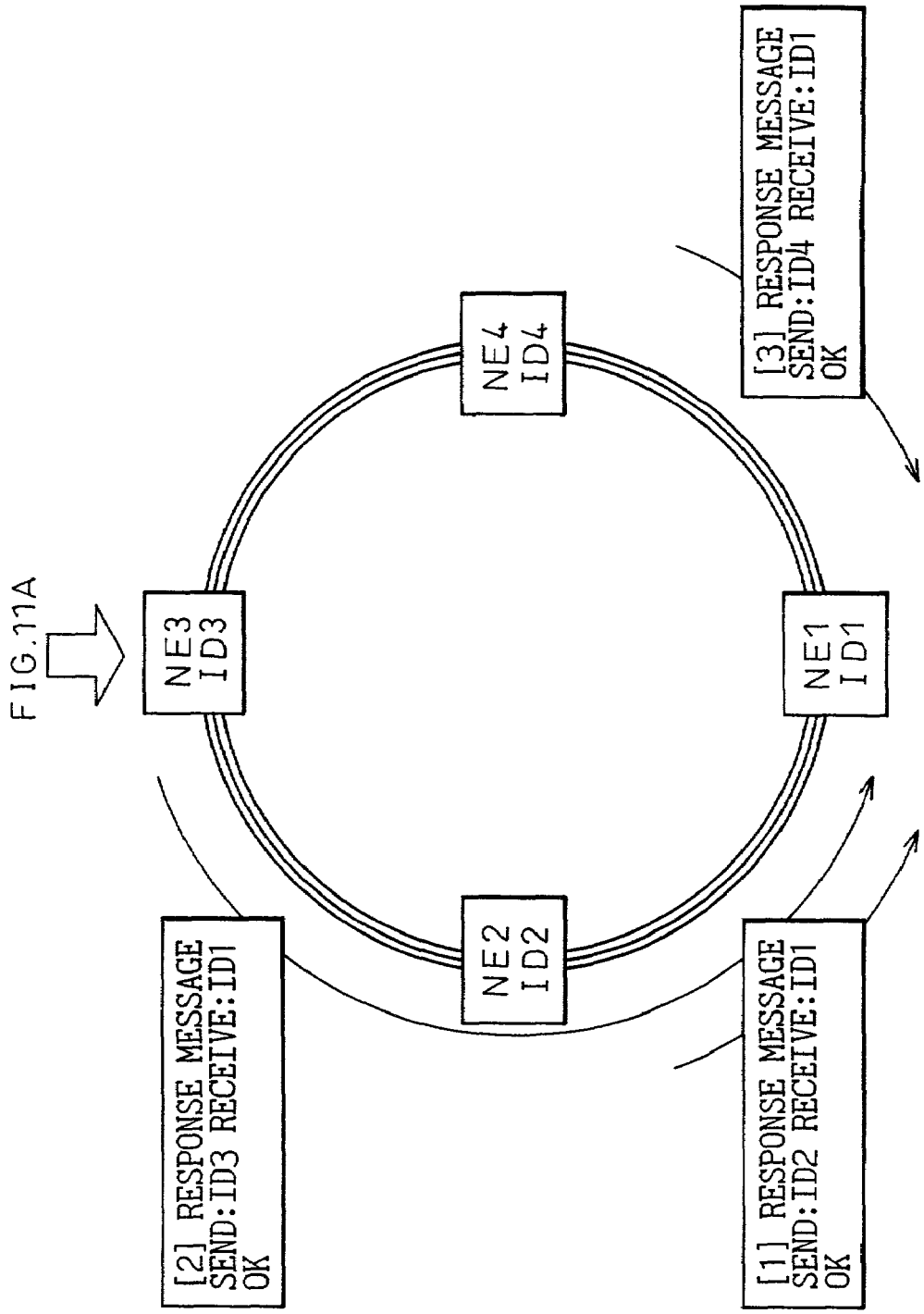

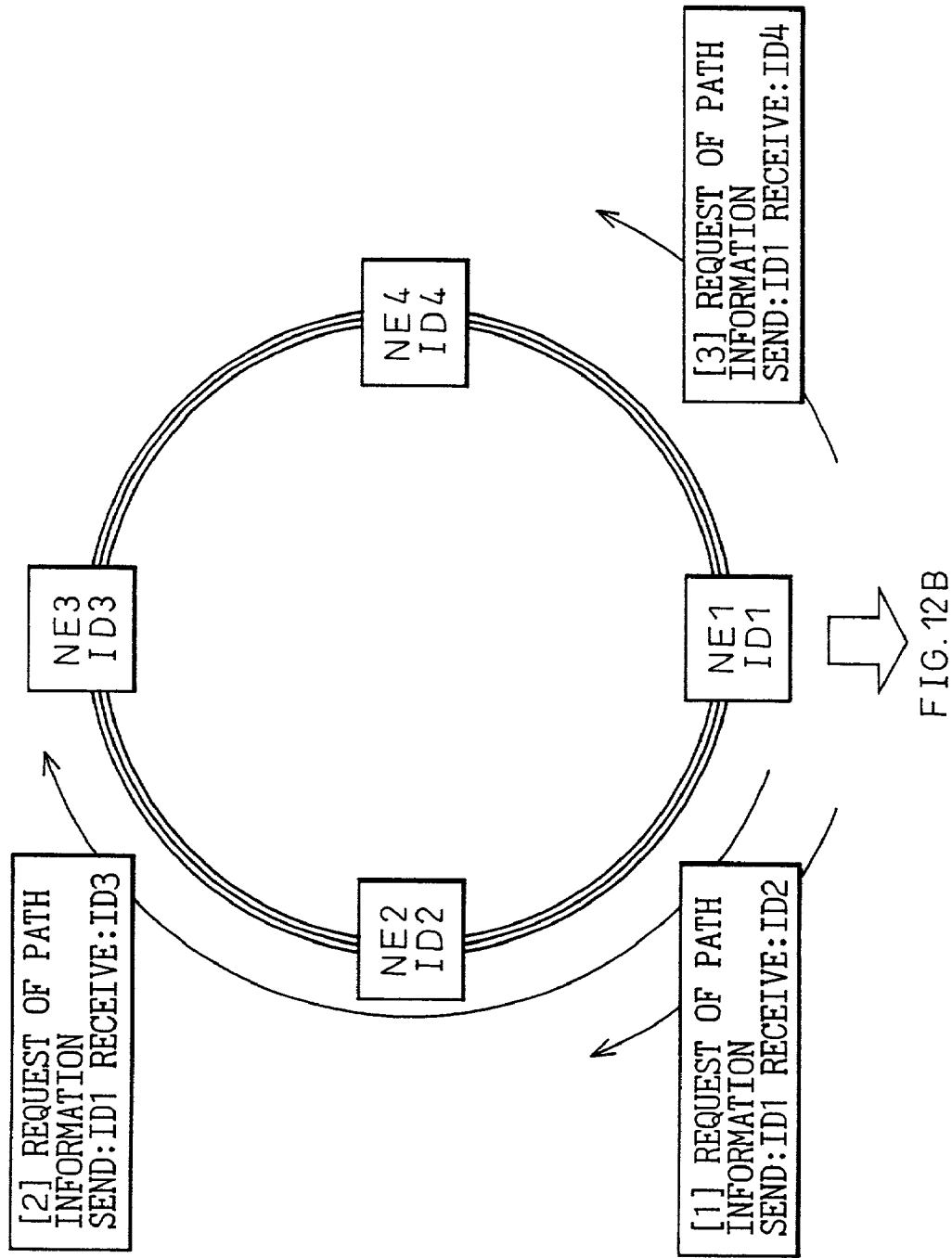

| From | To | CHANNEL SPEED | From | To | CHANNEL SPEED | From | To | CHANNEL SPEED | From | To | CHANNEL SPEED |
|---|---|---|---|---|---|---|---|---|---|---|---|
| L-1ch | HE-1ch | VC3 | HE-1ch | L-1ch | VC3 | HE-1ch | HW-1ch | VC3 | HE-1ch | HW-1ch | VC3 |
| L-1ch | HW-1ch | VC3 | HW-1ch | L-1ch | VC3 | HW-13ch | HE-13ch | VC3 | HE-13ch | L-13ch | VC3 |
| HE-13ch | HW-13ch | VC3 | L-13ch | HE-13ch | VC3 | HE-48ch | L-48ch | VC3 | HW-13ch | L-13ch | VC3 |
| HW-48ch | HE-48ch | VC3 | L-13ch | HW-13ch | VC3 | HW-48ch | L-48ch | VC3 | L-48ch | HE-48ch | VC3 |
|  |  |  | HW-48ch | HE-48ch | VC3 |  |  |  | L-48ch | HW-48ch | VC3 |
|  |  |  |  |  |  |  |  |  |  |  |  |
|  |  |  |  |  |  |  |  |  |  |  |  |

| From | To | CHANNEL SPEED | From | To | CHANNEL SPEED | From | To | CHANNEL SPEED | From | To | CHANNEL SPEED |
|---|---|---|---|---|---|---|---|---|---|---|---|
| L-1ch | HE-1ch | VC3 | HE-1ch | L-1ch | VC3 | HE-1ch | HW-1ch | VC3 | HE-1ch | HW-1ch | VC3 |
| L-1ch | HW-1ch | VC3 | HW-1ch | L-1ch | VC3 | HW-1ch | HE-1ch | VC3 | HE-13ch | L-13ch | VC3 |
| HE-13ch | HW-13ch | VC3 | L-13ch | HE-13ch | VC3 | HE-13ch | L-48ch | VC3 | HW-13ch | L-13ch | VC3 |
| HW-48ch | HE-48ch | VC3 | L-13ch | HW-13ch | VC3 | HE-48ch | L-48ch | VC3 | L-48ch | HE-48ch | VC3 |
| | | | HW-48ch | HE-48ch | VC3 | HW-48ch | HE-48ch | VC3 | L-48ch | HW-48ch | VC3 |
| | | | | | | | | | | | |
| | | | | | | | | | | | |
| | | | | | | | | | | | |

| From | To | CHANNEL SPEED | From | To | CHANNEL SPEED | From | To | CHANNEL SPEED | From | To | CHANNEL SPEED |
|---|---|---|---|---|---|---|---|---|---|---|---|
| L-1ch | HE-1ch | VC3 | HE-1ch | L-1ch | VC3 | HW-13ch | HE-13ch | VC3 | HE-13ch | L-13ch | VC3 |
| HE-13ch | HW-13ch | VC3 | L-13ch | HE-13ch | VC3 | HE-48ch | L-48ch | VC3 | HW-13ch | L-13ch | VC3 |
| HW-48ch | HE-48ch | VC3 | L-13ch | HW-13ch | VC3 | HW-48ch | L-48ch | VC3 | L-48ch | HE-48ch | VC3 |
| | | | HW-48ch | HE-48ch | VC3 | | | | L-48ch | HW-48ch | VC3 |

| From | To | CHANNEL SPEED | From | To | CHANNEL SPEED | From | To | CHANNEL SPEED | From | To | CHANNEL SPEED |
|---|---|---|---|---|---|---|---|---|---|---|---|
| L-1ch | HE-1ch | VC3 | HW-1ch | L-1ch | VC3 | HW-13ch | HE-13ch | VC3 | HW-13ch | L-13ch | VC3 |
|  |  |  | L-13ch | HE-13ch | VC3 | HE-48ch | L-48ch | VC3 | L-48ch | HW-48ch | VC3 |
|  |  |  |  |  |  |  |  |  |  |  |  |
|  |  |  |  |  |  |  |  |  |  |  |  |
|  |  |  |  |  |  |  |  |  |  |  |  |
|  |  |  |  |  |  |  |  |  |  |  |  |
|  |  |  |  |  |  |  |  |  |  |  |  |
|  |  |  |  |  |  |  |  |  |  |  |  |

| From | To | CHANNEL SPEED | From | To | CHANNEL SPEED | From | To | CHANNEL SPEED | From | To | CHANNEL SPEED |
|---|---|---|---|---|---|---|---|---|---|---|---|
| L-1ch | HE-1ch | VC3 | HW-1ch | L-1ch | VC3 | HW-13ch | HE-13ch | VC3 | HW-13ch | L-13ch | VC3 |
|  |  |  | L-13ch | HE-13 | VC3 | HE-1ch | L-48ch | VC3 | L-48ch | HW-1ch | VC3 |

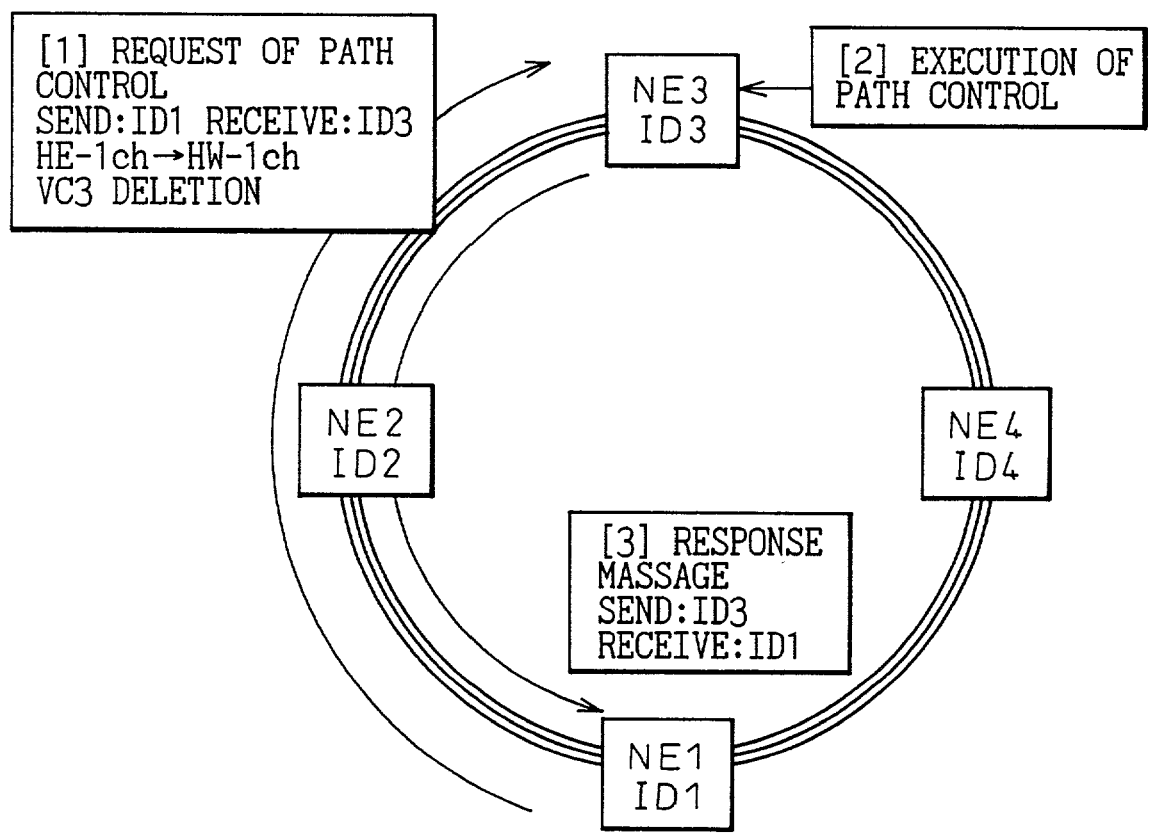

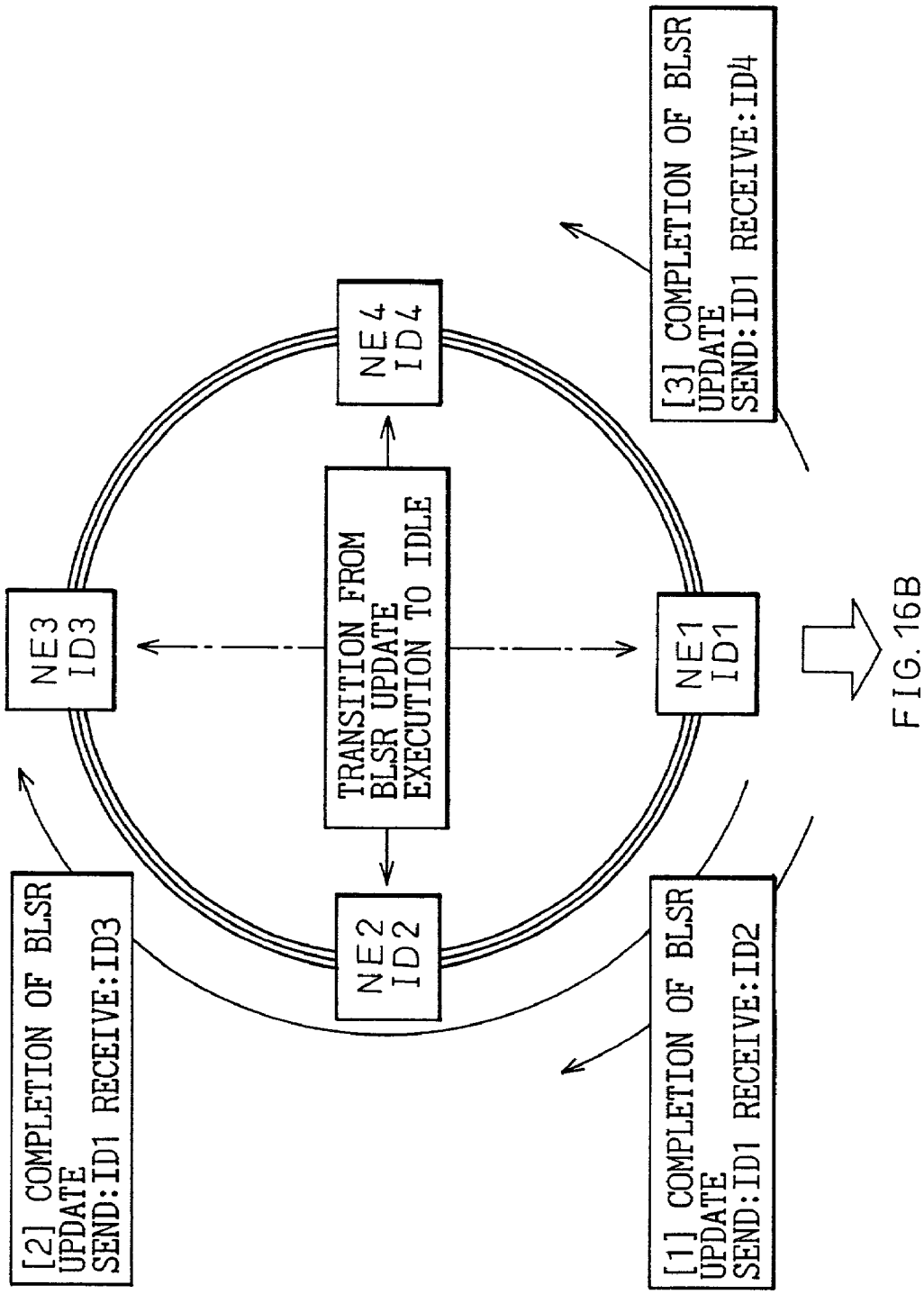

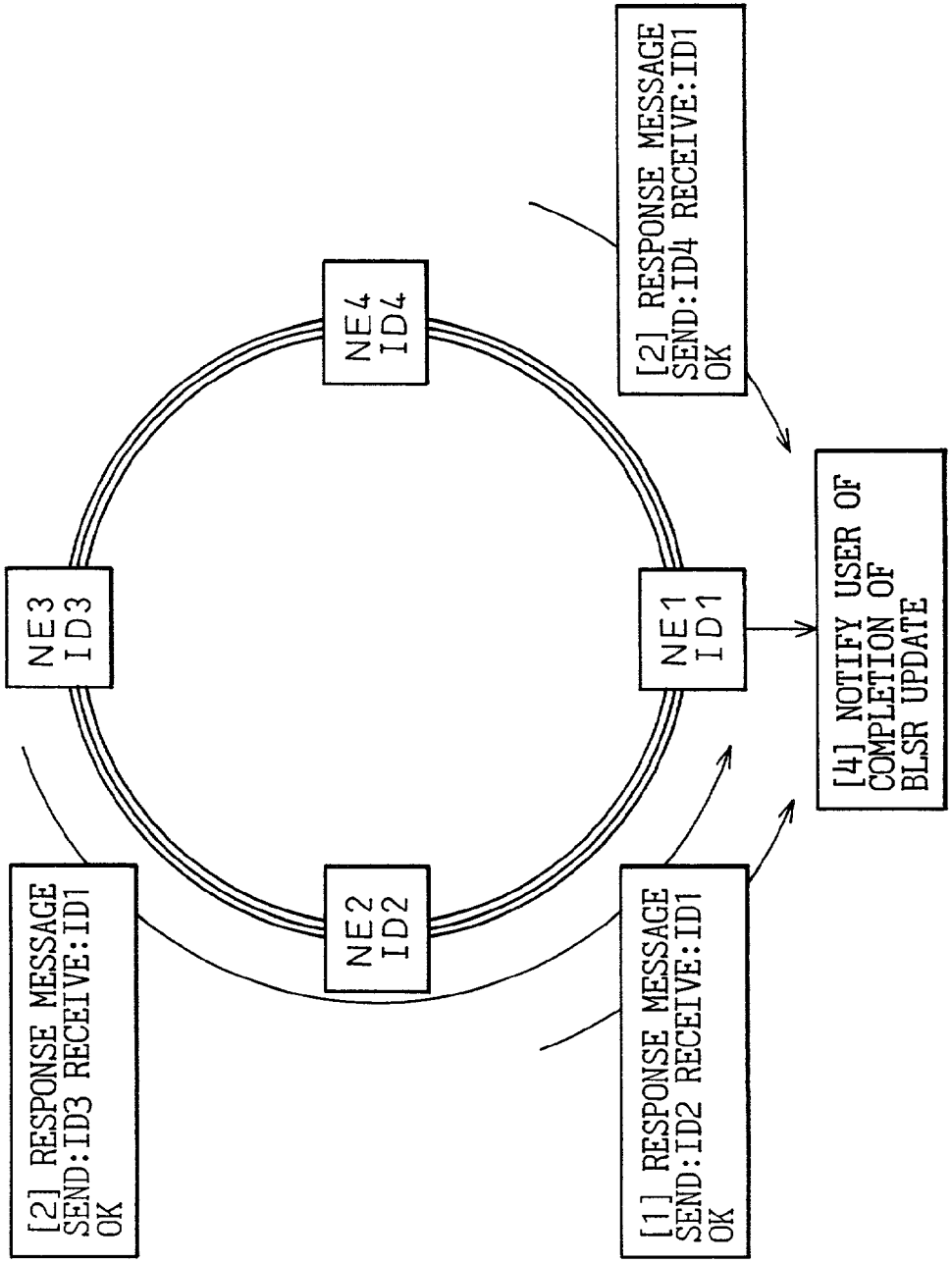

RING NETWORK AND METHOD FOR PATH INTERCHANGE THEREIN

BACKGROUND OF THE INVENTION

1. Field of the Invention

The present invention relates to a ring network comprised of a plurality of transmission apparatuses (nodes) connected via a ring-shaped transmission line and switching from a state operating under a uni-directional path switched ring (UPSR) mode to a bi-directional line switched ring (BLSR) mode by interchanging paths and to a method for path interchange therein.

2. Description of the Related Art

As will be explained in more detail with reference to the drawings later, for switching from the UPSR mode to the BLSR mode in a ring network, it is known to provide a transmission apparatus with a switch for switching between a function unit conforming to the UPSR mode and a function unit conforming to the BLSR mode and operate the switch etc. or to replace a protection side function unit of the UPSR mode with a protection side function unit of the BLSR mode, operate the protection side as the working side, and, during the operation, replace the working side function unit. Since excess mechanisms have to be added or the function units have to be replaced and then reconnected, the amount of work becomes greater and the time required for switching becomes longer.

Therefore, it may be considered to switch from the UPSR mode to the BLSR mode by a higher order operating system (Ops). In this case, however, an operator has to be present and change paths while determining the conditions of each path. The processing time therefore becomes extremely long. Further, it is not possible to deal with faults occurring in the process of path interchange processing.

SUMMARY OF THE INVENTION

An object of the present invention is to provide, in view of the above problems, a ring network and method for path interchange which can reduce the amount of processing, deal with the occurrence of faults, and lighten the load on an operator.

To attain the above object, there is provided a ring network comprised of a plurality of transmission apparatuses each including a cross-connect function unit and a communication function unit for sending and receiving messages using overhead of an SDH frame and a master transmission apparatus to which a command is input for switching from a UPSR to BLSR mode including a path management database, a path decision unit, and an interchange decision unit. The master transmission apparatus to which the command has been input for collecting and storing path setting information of all of the transmission apparatuses in the path management database and sequentially performing processing for deciding on and deleting a long path and processing for interchanging a path on a protection channel to an idle work channel by sending and receiving messages.

BRIEF DESCRIPTION OF THE DRAWINGS

These and other objects and features of the present invention will become clearer from the following description of the preferred embodiments given with reference to the attached drawings, wherein:

FIG. 3 is a view explaining a path management database;

FIGS. 6A and 6B are flow charts of processing for interchanging paths of an embodiment of the present invention;

FIGS. 9A and 9B are views explaining messages;

FIGS. 11A and 11B are views explaining a state of execution of a BLSR update command;

FIGS. 13A and 13B are views explaining a process of processing based on the path management database;

FIGS. 14A, 14B, and 14C are views explaining a process of processing based on the path management database;

FIG. 15 is a view explaining transmission of a path control request message;

FIGS. 16A and 16B are views explaining transmission of an update completion message;

DESCRIPTION OF THE PREFERRED EMBODIMENTS

Before describing the embodiments of the present invention, the related art and the disadvantages therein will be described with reference to the related figures.

Figure 17:
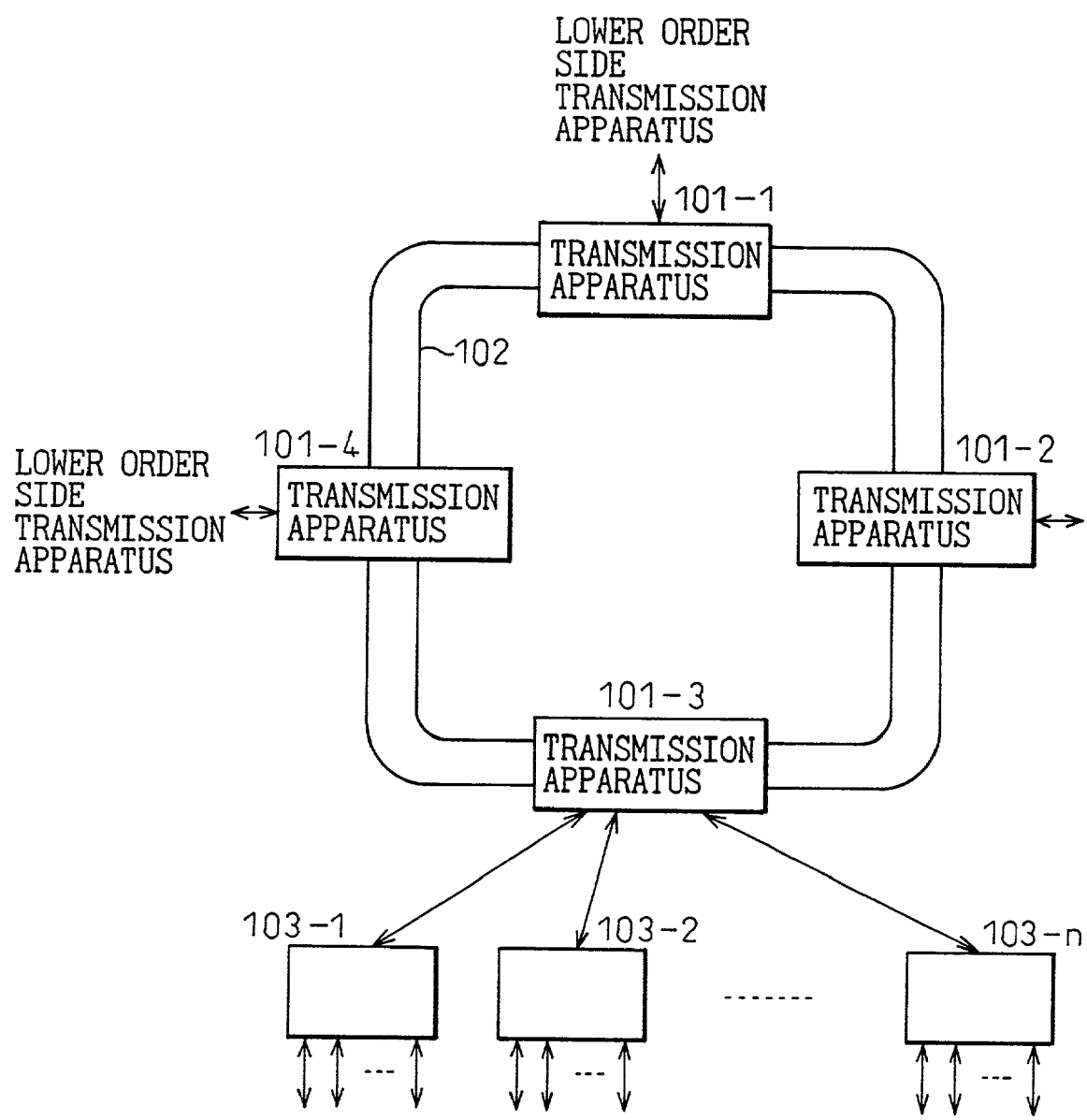
FIG. 17 is a view explaining a ring network.

FIG. 17 is a view explaining a ring network. The ring network is comprised of a plurality of transmission apparatuses 101-1 to 101-4 connected in the form of a ring by a transmission line 102. Note that while the case of connecting four transmission apparatuses 101-1 to 101-4 is shown, generally a larger number of transmission apparatuses are connected. Further, each of the transmission apparatuses 101-1 to 101-4 has one or more lower order transmission apparatuses 103-1 to 1-3-n connected to it or has a lower order transmission line connected to it.

The transmission line 102 is comprised of an optical fiber and transmits an optical signal by synchronous digital hierarchy (SDH). In such a ring network, there are the above-mentioned UPSR mode and BLSR mode as the operation mode.

Under the UPSR mode, in FIG. 17, for example, between the transmission apparatuses 101-3 and 101-2, one of the West path in the right direction from the transmission apparatus 101-3 and the East path in the left direction is used as a working side and the other is used as a protection side for simultaneous transmission of the same data. Therefore, the receiving side transmission apparatus receives and processes data through the working side path. When a fault occurs in the working side path, the path is switched to the protection side path to receive and process the data.

Further, under the BLSR mode, in FIG. 17, generally the path in the direction with the shortest transmission distance between the transmission apparatuses 101-3 and 101-2 is made the working side path. Therefore, that path is set between the transmission apparatuses 101-3 and 101-2 for mutual transmission of data. If a fault occurs in the working side path, the path is switched to one passing through the transmission apparatuses 101-1 and 101-4 corresponding to the protection side path for the transmission of data.

The UPSR mode in a ring network uses the paths of the two directions as the working path and protection path, so the efficiency of use of the transmission line 102 becomes 50 percent. As opposed to this, in the BLSR mode, the efficiency of usage of the transmission line 102 becomes 50 percent in the same way as the UPSR mode when there are two transmission apparatuses, but the greater the number of transmission apparatuses, the greater the number of idle working channels between the transmission apparatuses, so the higher the efficiency of use of the transmission line 102. Therefore, various proposals have already been made for switching from the UPSR mode to the BLSR mode (for example, see Japanese Unexamined Patent Publication (Kokai) No. 7-212381, Japanese Unexamined Patent Publication (Kokai) No. 9-214438, and Japanese Unexamined Patent Publication (Kokai) No. 10-313332).

Further, each transmission apparatus of the ring network operating under the UPSR mode holds its own path setting information. It does not know the path configurations of other transmission apparatuses. Therefore, when switching from the UPSR mode to the BLSR mode, the operator has to obtain a grasp of the path configurations of all transmission apparatuses in the ring by a higher order operating system (Ops), issue commands to all transmission apparatuses in the ring through the higher order operating system (Ops), and sequentially interchange all paths.

Figure 18:
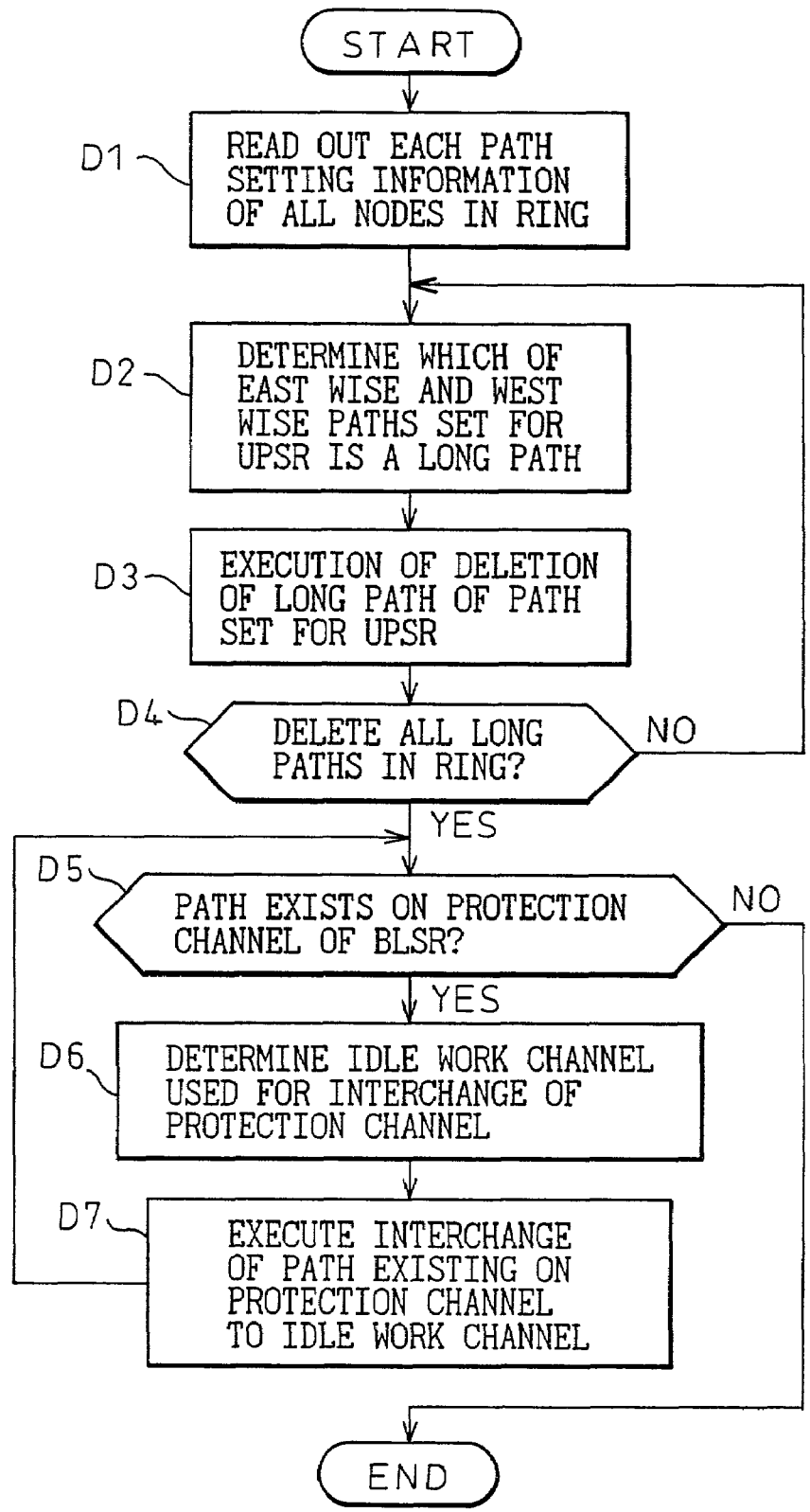
FIG. 18 is a flow chart of processing for interchanging paths of the related art.

FIG. 18 is a flow chart of the processing for interchanging paths in the related art. First, the path setting information of all of the transmission apparatuses (usually called "nodes") in the ring are read (D1). Next, which of the paths going East and going West are the long paths is determined (D2).

Next, the long paths in the paths set under the UPSR mode are deleted from the path setting information (D3). For example, in FIG. 17, between the transmission apparatuses 101-3 and 101-2, since the transmission apparatus 101-4 side in the path setting information, that is, the East path, becomes the long path, that path setting information is deleted. Next, it is decided whether all of the path setting information of the long paths in the ring have been deleted (D4). When the information has not finished being deleted, the routine proceeds to step D2. When the information has finished being deleted, the routine proceeds to step D5.

At step D5, it is decided if there is a path on the protection channel under the BLSR mode. That is, it is decided if there is a path set at the time of operation under the UPSR mode on the protection channel at the time of switching to the BLSR mode. When there is no such path, the routine ends, while when there is a path, an idle work channel for use for interchanging with the protection channel is determined (D6). The path present on the protection channel is interchanged with the idle work channel (D7), then the routine proceeds to step D5. This collection of path setting information for all transmission apparatuses and interchanging of paths are performed sequentially for each path in accordance with commands from a higher order operating system (Ops) by an operator.

As explained earlier, for switching from the UPSR mode to the BLSR mode in a ring network, it is known to provide a transmission apparatus with a switch for switching between a function unit conforming to the UPSR mode and a function unit conforming to the BLSR mode and operate the switch etc. or to replace a protection side function unit of the UPSR mode with a protection side function unit of the BLSR mode, operate the protection side as the working side, and, during the operation, replace the working side function unit. Since excess mechanisms have to be added or the function units have to be replaced and then reconnected, the amount of work becomes greater and the time required for switching becomes longer.

Therefore, as explained above, it may be considered to switch from the UPSR mode to the BLSR mode by a higher order operating system (Ops). In this case, however, an operator has to be present and interchange paths while determining the conditions of each path. The processing time therefore becomes extremely long. Further, it is not possible to deal with faults occurring in the process of path interchange processing.

Next, an explanation will be made of a ring network and method for path interchange of the present invention which can reduce the amount of processing, deal with the occurrence of faults, and lighten the load on an operator.

As explained with reference to FIG. 1, the ring network of the present invention is comprised of a plurality of transmission apparatuses, that is, network elements NE1 to NE4 connected in a ring like form through a transmission line. Each of the plurality of transmission apparatuses NE1 to NE4 includes a cross-connect function unit and a communication function unit for mutually communicating messages using the overhead of a transmission frame transferred over the transmission line. At least a transmission apparatus serving as a master among the plurality of transmission apparatuses NE1 to NE4, for example, the transmission apparatus NE1, includes a path management database for collecting and storing path setting information of all of the transmission apparatuses, a path decision unit for determining a long path when switching from a UPSR mode to a BLSR mode, and an interchange decision unit for determining interchange of a path on a protection channel to an idle work channel and requesting path interchange. Further, the path decision unit of the transmission apparatus has a means for determining a long path to be deleted based on the path setting information stored in the path management database and sending a request for deletion of the path setting information by the result of the decision. Further, the interchange decision unit has a means for deciding whether to change a path set on a protection channel to an idle work channel based on the path setting information stored in the path management database and sending a request for interchange.

The method of path interchange of the present invention is a method for changing from an operating state of the UPSR mode in a ring network comprised of a plurality of transmission apparatuses connected in the form of a ring by a transmission line to an operating state of a BLSR mode comprising a step of making one among the plurality of transmission apparatuses a master, inputting a command for updating from the UPSR mode to the BLSR mode to the master transmission apparatus and, in accordance with the command, having the master transmission apparatus collect path setting information of other transmission apparatuses and store it in a path management database, a step of deciding on a long path by referring to the path management database, deleting the path setting information of the long path, and updating the path management database and a step of deciding on a path on a protection channel referring to this path management database, changing the path to an idle work channel, and updating the path management database.

Further, the master transmission apparatus sends BLSR update request messages to the other transmission apparatuses to make each transmission apparatus shift to a BLSR update request state, sends BLSR update execution messages to make each transmission apparatus shift to a BLSR update execution state, and sends path information request messages. Each of the other transmission apparatuses sends a path information response message including path setting information in reply to said path information request message. The master transmission apparatus stores the received path setting information in the path management database, decides on a long path by referring to the path management database, sends a path control request message for deleting the path setting information of the long path, receives a response message in reply to the path control request message, and updates the path management database. The master transmission apparatus decides on a path on a protection channel by referring to the path management database, sends a path control request message for changing said path to an idle work channel, receives a response message in reply to said path control request message, updates said path management database, and makes the BLSR update execution state shift to an initial state. Further, the method further comprises sending the messages between the master transmission apparatus and the other transmission apparatuses using overhead of a transmission frame transferred over the transmission line.

Preferred embodiments of the present invention will be described in detail below while referring to the attached figures.

Figure 1:
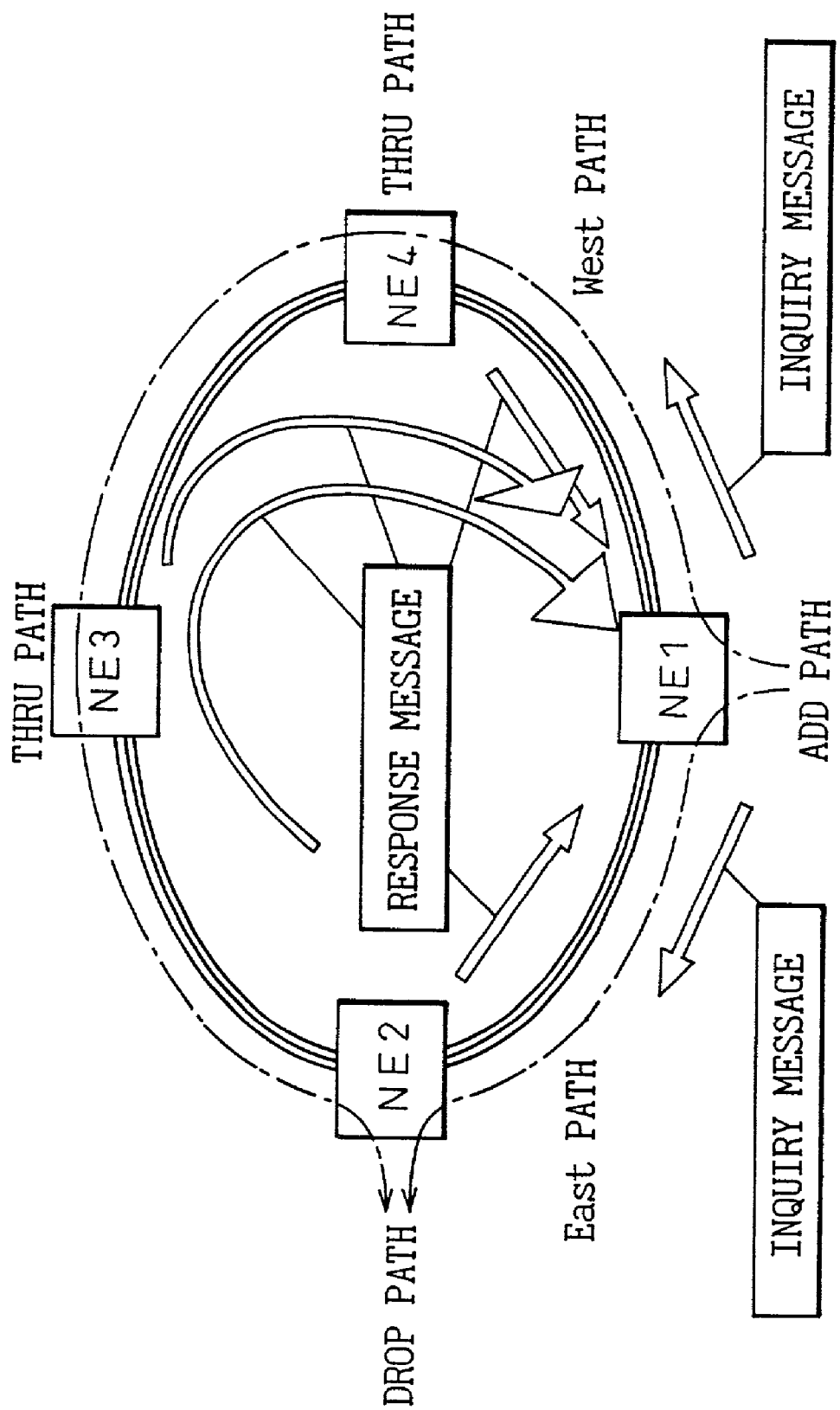
FIG. 1 is a view explaining an embodiment of the present invention.

FIG. 1 is a view explaining an embodiment of the present invention. A ring network comprised of transmission apparatuses NE1 to NE4 connected in the form of a ring by a transmission line is used in a state operating under the UPSR mode to send "ADD path" data (ADD) from the transmission apparatus NE1 to the transmission apparatus NE2 along an East path and West path as shown by the broken line arrows. In this case, the transmission apparatuses NE3 and NE4 are set to "THRU path" (THRU), while the transmission apparatus NE2 is set to "DROP path" (DROP). Each of the transmission apparatuses NE1 to NE4 holds its own path setting information.

When switching from the UPSR mode to the BLSR mode, for example, if the transmission apparatus NE1 is designated as the master apparatus, a command for switching from the UPSR mode to the BLSR mode is input to the transmission apparatus NE1. Due to this, the master transmission apparatus NE1 sends an inquiry message for collecting path setting information along the East path and West path.

As opposed to this, the transmission apparatus NE1 receives a response message from the DROP path transmission apparatus NE2 and response messages from the THRU path transmission apparatuses NE3 and NE4. The inquiry message and response messages in this case can be transmitted using the overhead of the SDH frame, for example, the K1 and K2 bytes. Each of the transmission apparatuses NE1 to NE4 has a termination processing function for overhead of the SDH frame, so it is possible to send and receive the various messages using this overhead. Therefore, it is possible to easily collect the path setting information of the other transmission apparatuses by the response messages.

Figure 2:
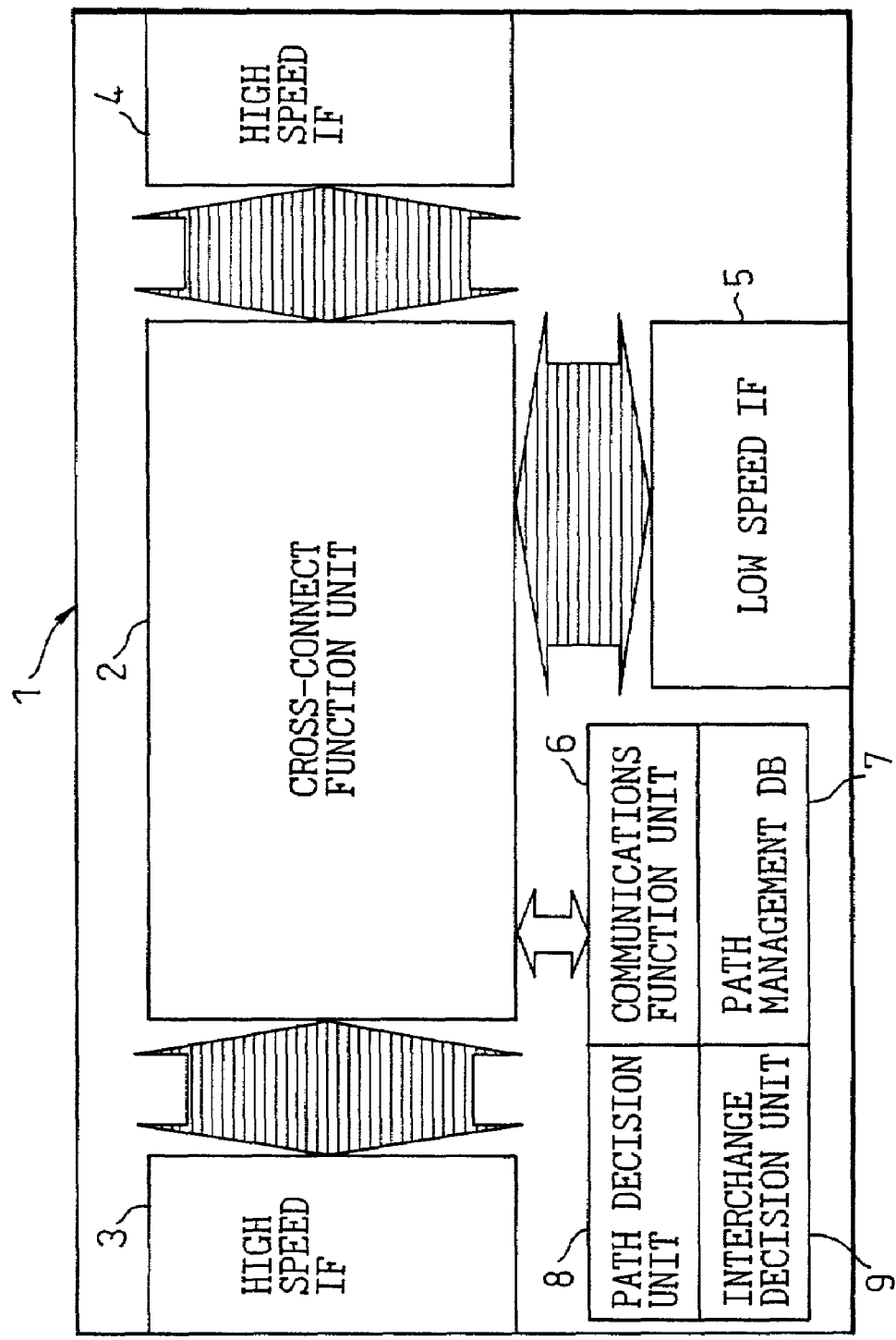
FIG. 2 is a view explaining a transmission apparatus of an embodiment of the present invention.

FIG. 2 is a view explaining the transmission apparatus of an embodiment of the present invention. Reference numeral 1 is a transmission apparatus, 2 is a cross-connect function unit, 3 and 4 are high speed interface units (IF), 5 is a low speed interface unit (IF), 6 is a communication function unit, 7 is a path management database (DB), 8 is a path decision unit, and 9 is an interchange decision unit.

The cross connect function unit 2 includes a control function unit (not shown) for controlling the path settings in accordance with the path setting information. It holds the path setting information in a memory in the control function unit and updates the path setting information held in the memory by a path setting command from a maintenance console etc. The high speed interface units 3 and 4 accommodate a transmission path connecting the transmission apparatuses 1. In an SDH transmission system, generally the signal is transmitted as an optical signal, so a transmission line comprised of an optical fiber is used for connection. On the other hand, when the cross-connect function unit 2 is not configured for cross connection with the optical signal as it is, it is configured including an optical/electrical conversion unit. Note that when the cross-connect unit 2 cross connects in the state of an optical signal, the optical/electrical conversion unit may be omitted. Further, the low speed interface unit 5 connects to lower order transmission apparatuses or a lower order transmission line.

The communication function unit 6 has the function of communicating with other transmission apparatuses using the overhead of an SDH frame. All of the transmission apparatuses of the ring network are provided with at least the above components. The master transmission apparatus however further includes a path management database (DB) 7, a path decision unit 8, and an interchange decision unit 9. The path management database 7 stores the path setting information of other transmission apparatuses collected by the master transmission apparatus using the response messages when switching from the UPSR mode to the BLSR mode. The path decision unit 8 has the functions of determining long paths when switching from the UPSR mode to the BLSR mode and requesting deletion of the path setting information of the long paths. The interchange decision unit 9 has the function of interchanging a path on a protection channel with an idle work channel when switching from the UPSR mode to the BLSR mode.

FIG. 3 is a view explaining the path management database. It shows an example of path setting information corresponding to the transmission apparatuses NE1 to NE4 (see FIG. 1) stored in the path management database 7 (see FIG. 2) of the master transmission apparatus. The "From" column shows channels of the receiver side, while the "To" column shows channels of the sender side. For example, "L-1ch" of the "From" column and "HE-1ch" of the "To" column of the transmission apparatus NE1 indicate to send channel 1 (1ch) of the lower order L as the higher order East path channel 1 (1ch). The channel speed VC3 indicates a 50 Mbps virtual container VC3 of the SDH. This corresponds a case where the lower order channel 1 is added (ADD). Further, "HE-13ch" of the "From" column and "HW-13ch" of the "To" column indicate to send the higher order East path channel 13 (13ch) to the higher order West path channel 13 (13ch). This shows the state of setting "THRU path".

"HE-1ch" of the "From" column and "L-1ch" of the "To" column of the transmission apparatus NE2 indicate to send the higher order East path channel 1 as the lower order channel 1 and indicate path setting information when dropping the lower order channel 1 (1ch) multiplexed as a higher order from the transmission apparatus NE1.

Figure 4:
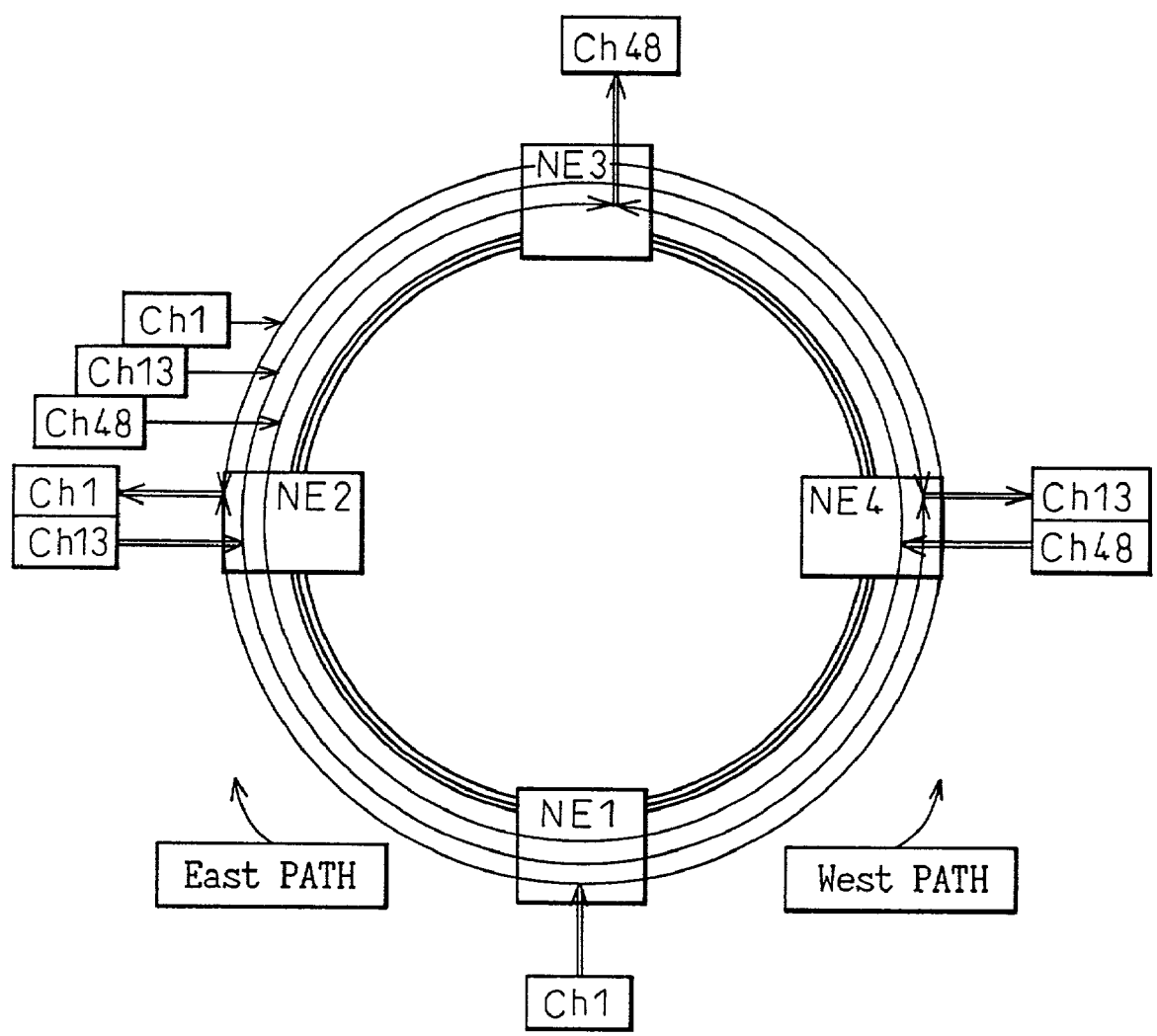
FIG. 4 is a view explaining the relationship with path setting information.

FIG. 4 shows the relationships in the ring network when storing path setting information collected from the transmission apparatuses in the path management database shown in FIG. 3 in the state operating under the UPSR mode. NE1 to NE4 correspond to transmission apparatuses, while Ch1, Ch13, and Ch48 correspond to the channels 1, 13, and 48 of the path setting information. That is, channel 1 (1ch) added at the transmission apparatus NE1 is sent along the East path and West path and dropped at the transmission apparatus NE2. Further, channel 13 (13ch) added at the transmission apparatus NE2 is dropped at the transmission apparatus NE4. Further, channel 48 (48ch) added at the transmission apparatus NE4 is dropped at the transmission apparatus NE3. This transmission apparatus NE3 sets "THRU path" for the higher order channel 1 (1ch) and channel 13 (13ch).

Figure 5:
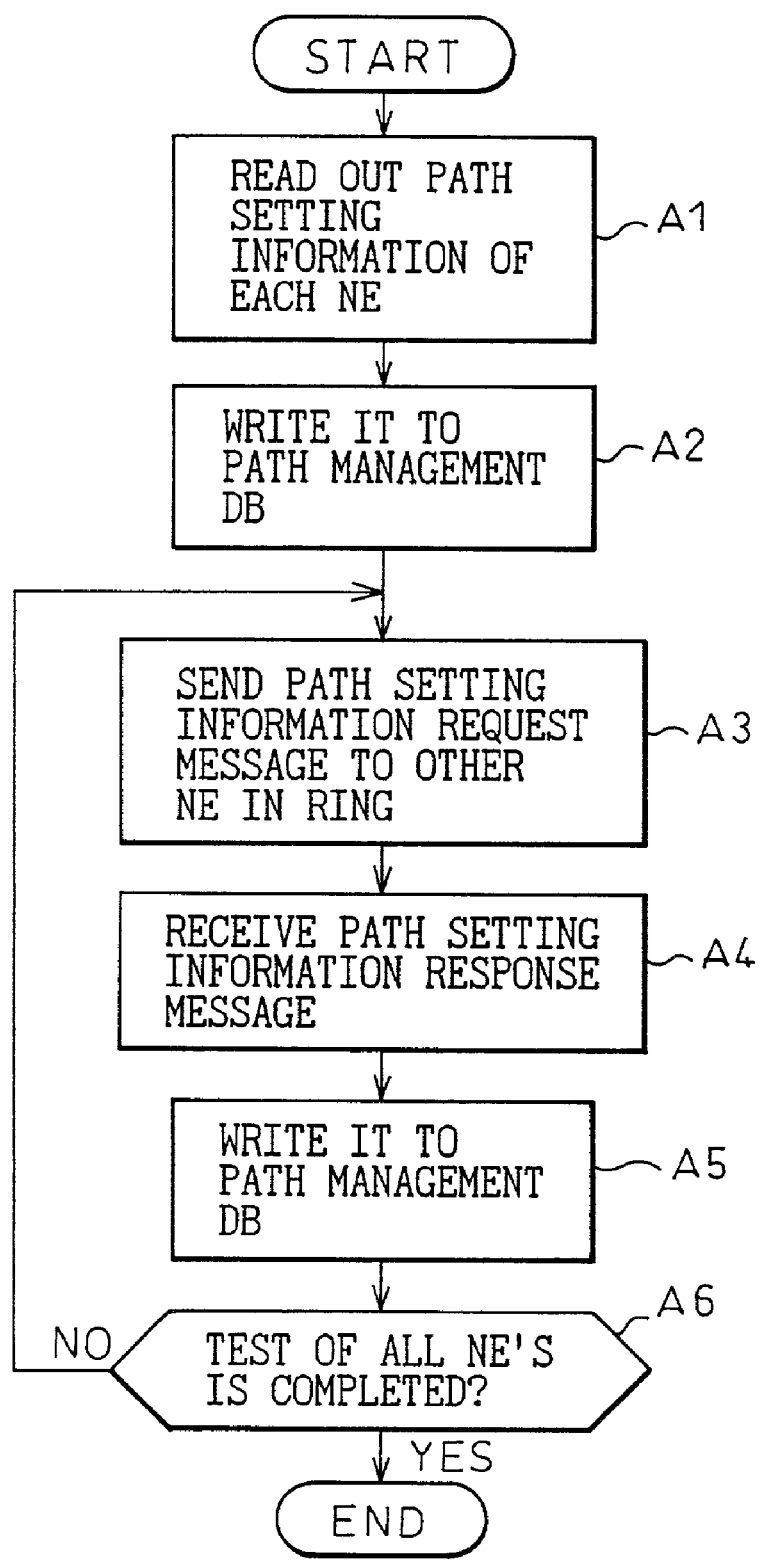
FIG. 5 is a flow chart of processing for collecting path setting information of an embodiment of the present invention.

FIG. 5 is a flow chart of the processing for collecting path setting information of an embodiment of the present invention. A transmission apparatus designated as the master by input of a command from an operator reads the apparatus's own path setting information (A1) and writes it into the path management database (A2), that is, writes the path setting information to the path management database 7. Next, the transmission apparatus sends path setting information request messages to the other transmission apparatuses NE2 to NE4 in the ring (A3). The other transmission apparatuses NE2 to NE4 send path setting information response messages in reply to the path setting information request messages. The master transmission apparatus NE1 receives these (A4) and write them into the path management database (A5), that is, writes the collected path setting information in the path management database.

Further, it decides if it has finished testing all transmission apparatuses (A6). That is, it decides if it has collected the path setting information of all of the transmission apparatuses NE1 to NE4 of the ring network. When it has not finished collecting the information, it proceeds to step A3. When it has finished collecting the information, it stores the path setting information of the transmission apparatuses NE1 to NE4 in the path management database 7 as shown for example in FIG. 3. The above messages are sent using the overhead of the transmission frame, that is, the SDH frame, of the transmission line by the communication function unit 6.

Figure 6B:
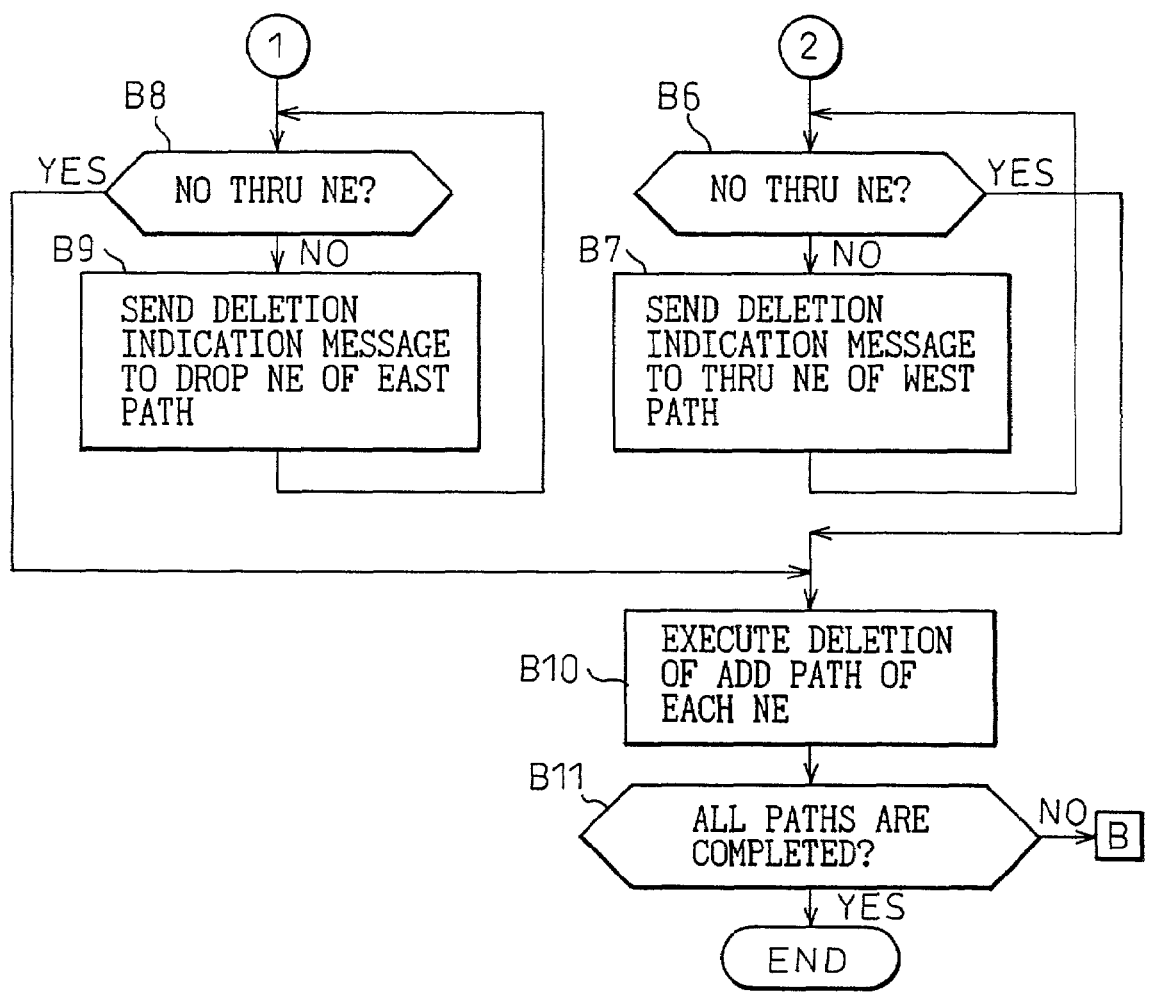

FIGS. 6A and 6B are flow charts of the processing for path interchange of an embodiment of the present invention. First the path decision unit 8 compares the numbers of THRU NEs, that is, the numbers of transmission apparatuses set to "THRU path", along the East paths and West paths with reference to the content of the path management database 7 (B1). Further, it decides if the number of the East path side is smaller (B2), that is, if the number of transmission apparatuses set to "THRU path" at the East path side is smaller.

When the numbers of the transmission apparatuses set to "THRU path" at the West path side and East path side are equal, it judges whether to give priority to the West path (B3). That is, it sets priority paths in advance when switching from the UPSR mode to the BLSR mode. When giving priority to the West path, it proceeds to step B5, while when giving priority to the East path, it proceeds to step B4.

When the number of transmission apparatuses at the East past side is smaller, it sends a deletion indication message to the West path DROP NEs (B4), that is, instructs deletion of the path setting information to the West path transmission apparatuses set to "DROP path". By this instruction, it transmits the results of decision of the path decision unit 8 to the communication function unit 6 from which deletion request messages for path setting information are sent using the overhead of the SDH frame.

The path decision unit 8 decides whether there are any THRU NEs (B6). That is, it decides if there are any transmission apparatuses set to "THRU path". When there are no such transmission apparatuses, it proceeds to step B10, while when there are such apparatuses, it sends release indication messages to the West path THRU NEs (B7), that is, sends deletion indication messages for the path setting information to the West path transmission apparatuses set to "THRU path" (B6).

When the number of East path side transmission apparatuses is greater than the number of West path side transmission apparatuses at step B2, the unit sends deletion indication messages to the East path DROP NEs (B5), that is, instructs deletion of the path setting information to the East path transmission apparatuses set to "DROP path". Further, it decides if there are any THRU NEs (B8). That is, it decides if there are any transmission apparatuses set to "THRU path". When there are no apparatuses, it proceeds to step B10, while when there are apparatuses, it sends release indication messages to the East path THRU NEs (B9), that is, sends deletion indication messages of path setting information to the East path transmission apparatuses set to "THRU path", and proceeds to step BB.

At step B10, the unit releases its own ADD path. That is, it deletes the ADD path setting information. Further, it decides if this has been completed for all paths (B11). When it has not been finished, it proceeds to step B1, while when it has been finished, it ends the processing for deletion in the path interchange processing step.

Figure 7:
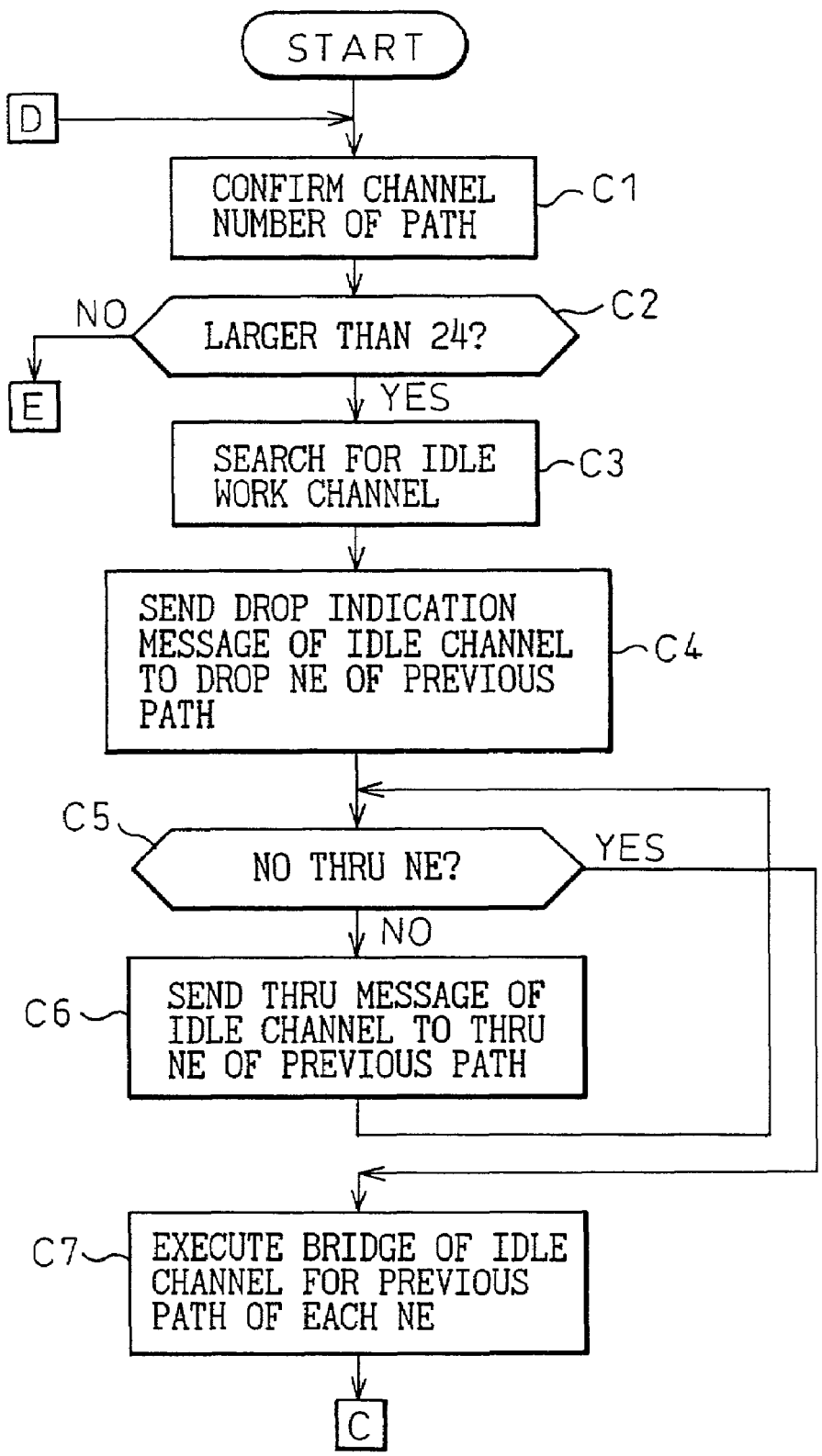
FIG. 7 is a flow chart of processing for interchanging a protection channel of an embodiment of the present invention.
Figure 8:
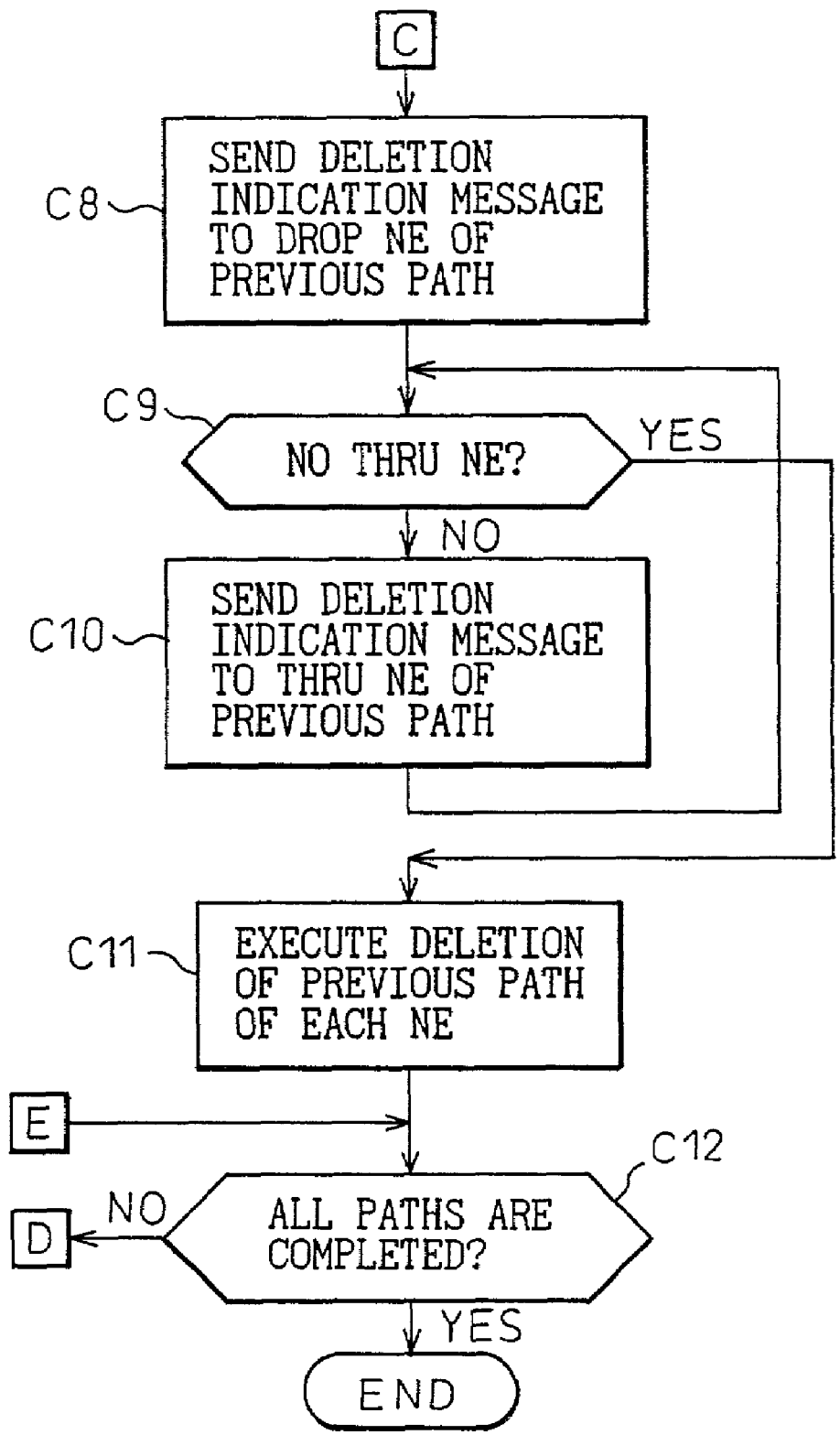
FIG. 8 is a flow chart of processing for interchanging a protection channel of an embodiment of the present invention.

FIG. 7 and FIG. 8 are flow charts of the processing for interchanging a protection channel of this embodiment of the present invention. It shows the example of using a lower order of 50 Mbps (corresponding to SDH virtual container VC3 or SONET OC-1) as a unit channel for the higher order of 2.4 Gbps (corresponding to SDH STM-16 or SONET OC-48). First, the interchange decision unit 9 refers to the path management database 7 to confirm the channel no. of the path (C1) and decides if the value is larger than 24 (C2). That is, since 48 channels worth of paths can be set, it decides the channel no. for half of that, that is, 24 channels. If 24 or less, it proceeds to step C12. If larger than 24, it searches for an idle work channel (C3) and sends a DROP indication message of the idle channel to the transmission apparatus set to drop of the previous path using the overhead of the SDH frame by the function of the communication function unit 6 in the same way as the sending of the previous messages (C4).

Further, it decides if there is any THRU NE, that is, if there is a transmission apparatus set to "THRU path" (C5). When there is none, it proceeds to step C7, while when there is one, it sends a THRU message of the idle channel to the transmission apparatus set to "THRU path" of the previous path (C6) and proceeds to step C5. At step c7, it bridges the idle channel to the previous path of the transmission apparatus and sends a release indication message to the transmission apparatus set to drop of the original path (C8).

Further, it decides if there is a transmission apparatus set to "THRU path" (C9). If there is none, it proceeds to step C11, while if there is one, it sends a deletion indication message to the transmission apparatus set to "THRU path" of the previous path (C10) and proceeds to step C9. Further, at step C11, it deletes its own previous path and decides if it has finished processing for all paths (C12). When not finishing it, it proceeds to step C1.

In the process of switching from the operating state of the UPSR mode of the ring network to the operating state of the BLSR mode, the transmission apparatus changes the states among the initial IDLE state, the BLSR update request state and the BLSR update execution state. The BLSR update request state is the state where the transmission apparatus is input with a BLSR update command by an operator or where the transmission apparatus receives a BLSR update command by transferring it from an adjoining transmission apparatus, which state is the state where whether a BLSR update can be executed is checked. The BLSR update execution state is the state where processing for collecting path setting information, deleting the long paths, and interchanging a protection channel and work channel are performed. In a state other than the IDLE state, setting of a path to a transmission apparatus by a command from the outside is prohibited.

FIGS. 9A and 9B are views explaining messages. FIG. 9A shows the message formats, while FIG. 9B shows the message types. As the message members shown in FIG. 9A, there are the message type showing the classification of the messages, the sending node ID showing the ID of the NE (transmission apparatus) sending the message, the receiving node ID showing the ID of the destination NE (transmission apparatus) of the message, and the message data different in content depending on the message type.

The message type and message data shown in FIG. 9A are related as shown in FIG. 9B. As the message type, there are a BLSR update request, BLSR update execution, BLSR update completion, response, path information request, path information response, and path control request. Further, when the message data corresponding to the message type is for example a BLSR update request, the node ID is added as a message data, while when it is a response, OK or NG (no good) is added as message data.

Figure 10:
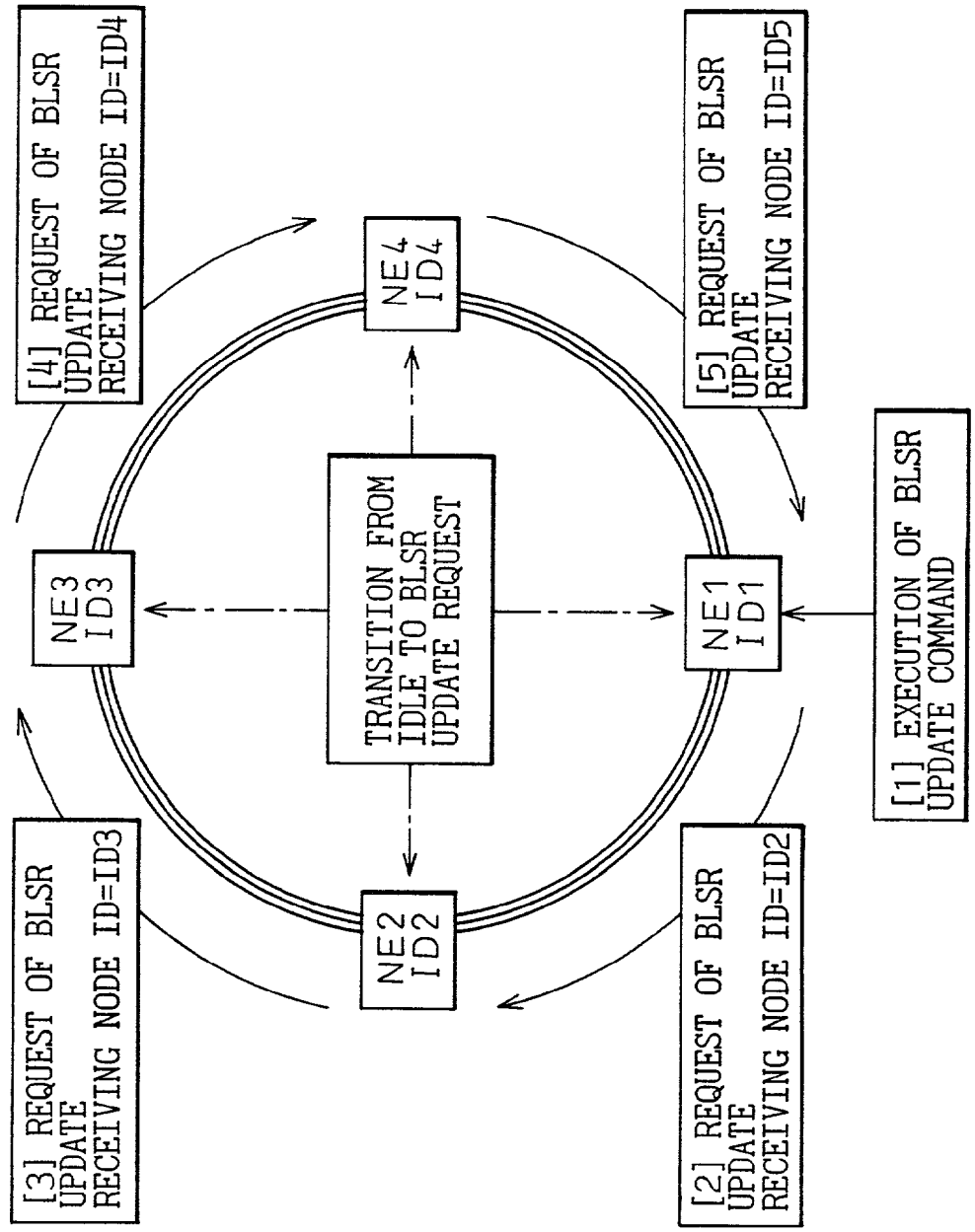
FIG. 10 is a view explaining execution of a BLSR update command.

FIG. 10 shows the case of input of a BLSR update command from an operator or higher order operating system (Ops) to the transmission apparatus NE1 among the transmission apparatuses NE1 to NE4 of the ring network operating under the UPSR mode. The transmission apparatuses NE1 to NE4 are given the ID1 to ID4 as node IDs. The transmission apparatus NE1 makes the message type the BLSR update request and sends the BLSR update request message with the sending node ID of ID1 and the receiving node ID of ID2 using the overhead of the SDH frame by the communication function unit 6.

The transmission apparatus NE2 receives the BLSR update request message in accordance with the receiving node ID of ID2 and sends the BLSR update request message having the receiving node ID+1 (=ID3). The transmission apparatus NE3 receives the BLSR update request message in accordance with the receiving node ID of ID3 and sends a BLSR update request message having the receiving node ID+1 (=ID4). The transmission apparatus NE4 receives the BLSR update request message in accordance with the receiving node ID=ID4 and sends a BLSR update request message having the receiving node ID+1 (=ID5). The transmission apparatus NE1 receiving the BLSR update request message having the receiving node ID of ID5 can confirm that the BLSR update request message has been transmitted to all transmission apparatuses of the ring network since the NE1 has an ID1 and the receiving node ID is ID5 and ID1<ID5.

Each of the transmission apparatuses NE1 to NE4 receiving the BLSR update request message shifts from an initial idle state where it operates under the UPSR mode and a BLSR update is not requested to the state of a BLSR update request, as shown by IDLE→BLSR UPDATE REQUEST in FIG. 10.

Next, as shown in FIG. 11A, the transmission apparatus NE1 sends BLSR update execution messages to the transmission apparatuses NE2 to NE4. At this time, "Send:ID1" indicates the sending node ID, while "Receive:ID2 to ID4" indicates the receiving node IDs. That is, the master transmission apparatus NE1 designates the other transmission apparatuses NE2 to NE4 by the receiving node IDs and sends the BLSR update execution messages having the ID of the transmission apparatus NE1 as the sending node ID. Due to this, the transmission apparatuses shift from the state of the BLSR update request to the state of BLSR update execution.

The transmission apparatuses NE2 to NE4 receiving the BLSR update execution messages, as shown in FIG. 11B, send response messages having their own IDs added as sending node IDs to the master transmission apparatus NE1.

Figures 12A, 12B:
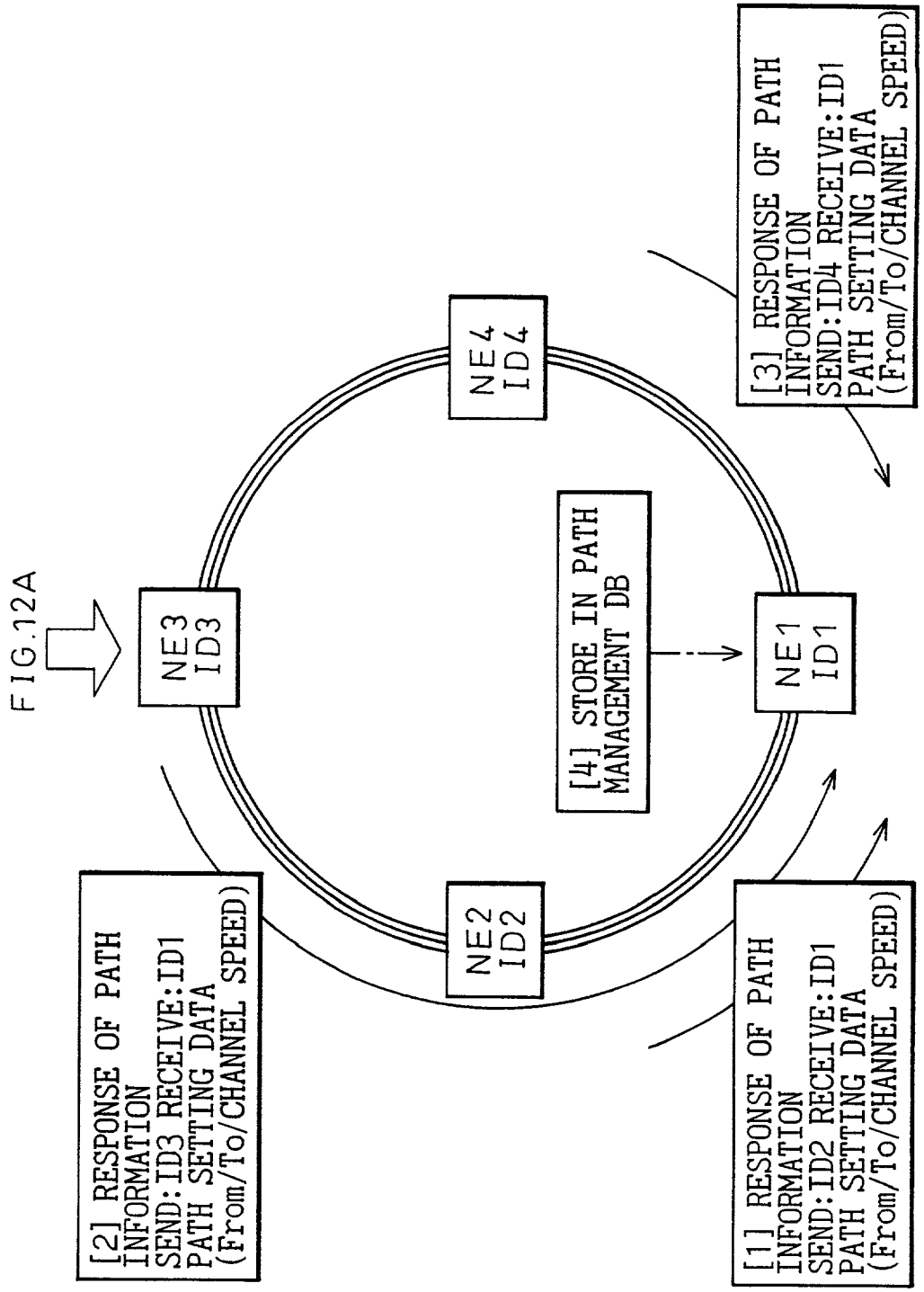
FIGS. 12A and 12B are views explaining collection of path setting information.

Next, as shown in FIG. 12A, the master transmission apparatus NE1 sends path information request messages designating the transmission apparatuses NE2 to NE4. The transmission apparatuses NE2 to NE4 receiving the path information request messages, as shown in FIG. 12B, add their own IDS and send path setting information indicated as the path setting data (From/To, channel speed) by path information response messages to the master transmission apparatus NE1. The transmission apparatus NE1 stores the collected path setting information in the path management database (DB). Due to this, for example, it is possible to construct the path management database shown in FIG. 3.

FIGS. 13A and 13B and FIGS. 14A to 14C show the contents of the path management database in the process of shifting to the state of execution of the BLSR update and path interchange by the sequence of <1> to <5>. <1>of the path management database is the same as the content shown in FIG. 3 and shows the path setting information during operation under the UPSR mode collected by the path information response messages in the operation of step A4 of the flow chart of FIG. 5 and FIG. 12B.

Further, the long paths are detected and deleted in accordance with the steps shown in FIGS. 6A and 6B. That is, the path decision unit 8 searches through the transmission apparatuses NE1 to NE4 in that order. When detecting a path being added, it decides on which of the East path or West path is the long path. For example, the transmission apparatus NE1 adds the lower order channel 1 (1ch). The path becomes NE1→NE2 (DROP) in the East direction and NE1→NE4→NE3→NE2 in the West direction. Therefore, the West path becomes the long path. Therefore, in the path management database, the path setting information, which is displayed in boxes with leftward hatchings, in <2> of FIG. 13B forms the long path.

Therefore, the transmission apparatus NE1 sends the long path deletion request by a path control request message. In FIG. 15, the transmission apparatus NE1 sends the transmission apparatus NE3 a path control request message having a sending node ID of ID1 and a receiving node ID of ID3 for deletion of HE-1ch→HW-1ch VC3. Due to this, the transmission apparatus NE3 executes the path control and sends a response message having the sending node ID=ID3 and the receiving node ID=ID1.

Specifically, the paths are deleted in order from the transmission apparatus at the drop side. Showing this as a relation of From→To of the path setting information, for <1>of FIG. 13A, the HE-1ch→L-1ch of the transmission apparatus NE2 is deleted, then the HE-1ch→HW-1ch of the transmission apparatus NE3 is deleted, the HE-1ch→HW-1ch of the transmission apparatus NE4 is deleted, and the L-1ch→HW-1ch of the transmission apparatus NE1 is deleted. That is, the path setting information displayed in boxes with leftward hatchings white in <2> of FIG. 13B is deleted.

The state with the long paths deleted are shown as <3> of FIG. 14A. Next, the long paths are again determined. In this case, looking at the lower order L-13ch added from the transmission apparatus NE2, the East path becomes NE2 (ADD)→NE3→NE4 (DROP), while the West path becomes NE2 (ADD)→NE1→NE4 (DROP). The numbers of transmission apparatuses are the same. A priority order is set in advance in the above way for when the number of transmission apparatuses of the East path and the number of transmission apparatuses of the West path are the same in this way. For example, when the East path is given priority, in the West path, the HE-13ch→L-13ch of the transmission apparatus NE4 is deleted, then the HE-13ch→HW-13ch of the transmission apparatus NE1 is deleted, then the HE-13ch→HW-13ch of the transmission apparatus NE2 is deleted. That is, the path setting information displayed in boxes with leftward hatchings in <3> of FIG. 14A is deleted.

Next, the processing for protection channel interchange is started. That is, the interchange decision unit 9 searches through the path management database 7 in the order of the transmission apparatuses NE1 to NE4. When detecting a path being added, it decides if the path is set on the protection channels (25ch to 48ch). When set, it searches for idle work channels (1ch to 24ch) for interchange.

It then deletes the path setting information displayed in boxes with leftward hatchings in <3> of FIG. 14A, updates the path management database, and decides if the state set on the protection channel remains based on the path setting information. For example, the channel 48 (48ch) of the transmission apparatuses NE4→NE3 is present on the protection channel. Therefore, the unit searches through the idle work channels (1ch to 24ch) between the transmission apparatuses NE3 and NE4 in ascending order of the channels. In this case, since the channel 1 (1ch) is not being used, it interchanges 48ch→1ch. Therefore, the transmission apparatus NE1 sends the path control request message and requests bridging to HW-1ch.

Due to this, the transmission apparatus NE4 bridges L-48ch→HW-1ch. Next, it sends the transmission apparatus NE3 a request for switching from HE-48ch to HE-1ch. The transmission apparatus NE3 switches HE-48ch→L-48ch to HE-1ch→L-48ch. Further, it deletes the path setting information which became unnecessary last. Further, since there is a path remaining on the protection channel between the transmission apparatuses NE1 and NE2, as mentioned above, it interchanges the paths and deletes the information. As a result of this, the path setting information becomes as shown in <5> of FIG. 14C.

Note that the case is shown where there is an idle work channel between the transmission apparatuses NE4 and NE3 and a channel on the protection channel is switched to an idle work channel. At this time, when there is no idle work channel, the transmission apparatus searches for an idle work channel in the opposite NE4→NE1→NE2→NE3 direction in the ascending order of the channels. When it detects an idle work channel, it interchanges the path with the work channel in the NE4→NE1→NE2→NE3 direction.

When all of the protection channels have finished being interchanged, the transmission apparatus NE1 returns the BLSR update state to the idle state and sends BLSR update completion messages to the other transmission apparatuses NE2 to NE4. The transmission apparatuses NE2 to NE4 also return the BLSR update state to the idle state. Due to this, it is possible to operate under the BLSR mode.

That is, as shown in FIG. 16A, the transmission apparatus NE1 sends the transmission apparatuses NE2 to NE4 BLSR update completion messages each added with the sending node ID and receiving node IDs. Due to this, the transmission apparatuses NE1 to NE4 shift from the BLSR update execution state shifted to, at FIGS. 11A and 11B, to the initial idle state, at FIG. 10. Further, as shown in FIG. 16B, when receiving response messages including OK messages from other transmission apparatuses NE2 to NE4, the transmission apparatus NE1 notifies the user (operator) of the completion of BLSR update.

As mentioned above, in the process of changing from an operating state of the UPSR mode to an operating state of the BLSR mode in a ring network, the processing including the path interchange can be executed by the master transmission apparatus. It should be understood that the present invention is not limited to the disclosed embodiments but able to apply some modifications thereto depending on the number of the transmission apparatuses etc.

Summarizing the effects of the invention, as explained above, the present invention inputs commands for having a transmission apparatus designated as a master apparatus sequentially execute a routine for switching from a working state of the UPSR mode to a working state of the BLSR mode in a ring network comprised of a plurality of transmission apparatuses connected in the form of a ring by a transmission line. Due to this, the load on the operator is remarkably lightened and the time required for switching can be shortened. Further, since the path setting information of each transmission apparatus is sent as a response message to the master transmission apparatus in accordance with a path information request message from the master transmission apparatus and the collected path setting information is stored in the path management database, it is possible to collect the newest path setting information of the transmission apparatuses. Therefore, there is the advantage that it is possible to execute processing such as path interchange while recognizing the state of path settings. Note that it may also be considered to download to the transmission apparatuses the path setting information of the network from a higher network monitoring apparatus etc. such as a higher operating system (Ops). If doing this, however, since the download time is relatively long, this is insufficiently fast. Further, the path setting information given to the transmission apparatuses would not necessarily be the latest path setting information. According to the present invention, however, it is possible to collect the newest path setting information quickly.

Further, since data continues to be transmitted in the process of the switching, it is possible to shorten the period during which there is no path redundancy in the process of deleting a long path or changing a path on the protection channel to an idle work channel. Therefore, it is possible to maintain the reliability of the ring network in the process of switching. Further, since a request message or response message is sent using overhead of the transmission frame transferred over the transmission line, there is no increase in the processing load in the transmission apparatuses and it is possible to sequentially execute the processing for deleting the path setting information of a long path or changing a path remaining on a protection channel to a work channel in accordance with the switching routine without decision of an operator.

While the invention has been described with reference to specific embodiments chosen for purpose of illustration, it should be apparent that numerous modifications could be made thereto by those skilled in the art without departing from the basic concept and scope of the invention.

The present disclosure relates to subject matter contained in Japanese Patent Application No. 2001-109453, filed on Apr. 9, 2001, the disclosure of which is expressly incorporated herein by reference in its entirety.

What is claimed is:

1. A ring network comprised of a plurality of transmission apparatuses connected in a ring shape by a transmission line,
   each of said plurality of transmission apparatuses including a cross-connect function unit and a communication function unit communicating among them over said transmission line using overhead of a transmission frame,
   at least a transmission apparatus serving as a master among the plurality of transmission apparatuses including a path management database for collecting and storing path setting information of all of said transmission apparatuses, a path decision unit for determining a long path when switching from a UPSR mode to a BLSR mode, and an interchange decision unit for determining interchange of a path on a protection channel to an idle work channel and requesting path interchange.

2. A ring network as set forth in claim 1, wherein
   said path decision unit has a means for deciding on a long path to be deleted based on path setting information stored in said path management database and sending a request for deletion of path setting information based on the result of the decision and
   an interchange decision unit has a means for deciding whether to change a path set on a protection channel to an idle work channel and sending a request for interchange based on path setting information stored in said path management database.

3. A method of path interchange for changing, in a ring network comprised of a plurality of transmission apparatuses connected in the form of a ring by a transmission line, from an operating state of the UPSR mode to an operating state of a BLSR mode comprising:
   making one among the plurality of transmission apparatuses a master,
   inputting a command for updating from the UPSR mode to the BLSR mode to the master transmission apparatus and,
   in accordance with the command, having the master transmission apparatus
   collect path setting information of other transmission apparatuses to store it in a path management database,
   decide on a long path by referring to the path management database, delete the path setting information of the long path, and update the path management database and
   decide on a path on a protection channel referring to said path management database, change the path to an idle work channel, and update the path management database.

4. A method of path interchange as set forth in claim 3, further comprising:
   a step of having a master transmission apparatus send a BLSR update request message to other transmission apparatuses to make each transmission apparatus shift to a BLSR update request state, send a BLSR update execution message to make each transmission apparatus shift to a BLSR update execution state, and send a path information request message;
   having each of said other transmission apparatuses send a path information response message including path setting information in reply to said path information request message; and
   having said master transmission apparatus store the received path setting information in the path management database, and
   a step of having a master transmission apparatus decide on a long path by referring to the path management database;
   send a path control request message for deleting the path setting information of the long path;
   receive a response message in reply to said path control request message; and
   update said path management database; and
   a step of having said master transmission apparatus decides on a path on a protection channel by referring to this path management database;
   send a path control request for interchanging said path to an idle work channel;
   receive a response message in reply to said path control request message to update said path management database; and
   make the BLSR update execution state shift to an initial state.

5. A method of path interchange as set forth in claim 4, further comprising sending said messages between said master transmission apparatus and said other transmission apparatuses using overhead of a transmission frame transferred over said transmission line.

* * * * *